US009615363B2

(12) United States Patent
Seo et al.

(10) Patent No.: US 9,615,363 B2
(45) Date of Patent: *Apr. 4, 2017

(54) METHOD AND APPARATUS FOR TRANSMITTING AND RECEIVING DOWNLINK CONTROL INFORMATION FOR REPEATER

(71) Applicant: LG ELECTRONICS INC., Seoul (KR)

(72) Inventors: Hanbyul Seo, Anyang-si (KR); Byounghoon Kim, Anyang-si (KR); Kijun Kim, Anyang-si (KR); Hakseong Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/868,107

(22) Filed: Sep. 28, 2015

(65) Prior Publication Data

US 2016/0021644 A1    Jan. 21, 2016

Related U.S. Application Data

(63) Continuation of application No. 13/580,942, filed as application No. PCT/KR2011/003626 on May 17, 2011, now Pat. No. 9,191,159.

(Continued)

(51) Int. Cl.
*H04W 72/00* (2009.01)
*H04W 72/04* (2009.01)
(Continued)

(52) U.S. Cl.
CPC ...... *H04W 72/042* (2013.01); *H04B 7/15542* (2013.01); *H04J 11/0086* (2013.01);
(Continued)

(58) Field of Classification Search
None
See application file for complete search history.

(56) References Cited

U.S. PATENT DOCUMENTS

2009/0196177 A1    8/2009   Teyeb et al.
2010/0159935 A1    6/2010   Cai et al.
(Continued)

FOREIGN PATENT DOCUMENTS

JP          5763753 B2      8/2015
WO     WO 2009/057286 A1   5/2009
(Continued)

OTHER PUBLICATIONS

3GPP TS 36.213 V8.6.0 (Mar. 2009), Technical Specification, 3rd Generation Partnership Project; Technical Specification Group Radio Access Network; Evolved Universal Terrestrial Radio Access (E-UTRA); Physical layer procedures, (Release 8).

(Continued)

*Primary Examiner* — Hassan Phillips
*Assistant Examiner* — Gautam Sharma
(74) *Attorney, Agent, or Firm* — Birch, Stewart, Kolasch & Birch, LLP

(57) ABSTRACT

A method for a relay to receive downlink control information from a base station through a Relay-Physical Downlink Control Channel (R-PDCCH), and the relay therefore are discussed. The method according to one embodiment includes determining one or more candidate positions for the R-PDCCH; monitoring whether or not the R-PDCCH is being transmitted at the one or more candidate positions; and receiving, through the monitoring that the R-PDCCH is being transmitted, the downlink control information included in the R-PDCCH. The one or more candidate positions are set as a Virtual Resource Block (VRB) set including N VRBs, and a combination of 2 adjacent candi- (Continued)

date positions among candidate positions of a lower aggregation level composes one of candidate positions of a higher aggregation level. The VRBs of the VRB set are assigned numbers. Respective candidate positions for the R-PDCCHs of aggregation levels L are determined as VRBs.

12 Claims, 27 Drawing Sheets

Related U.S. Application Data

(60) Provisional application No. 61/345,574, filed on May 17, 2010, provisional application No. 61/356,547, filed on Jun. 18, 2010, provisional application No. 61/358,380, filed on Jun. 24, 2010, provisional application No. 61/366,521, filed on Jul. 21, 2010, provisional application No. 61/366,638, filed on Jul. 28, 2010, provisional application No. 61/376,680, filed on Aug. 25, 2010, provisional application No. 61/376,694, filed on Aug. 25, 2010, provisional application No. 61/391,078, filed on Oct. 8, 2010.

(51) Int. Cl.
*H04L 5/00* (2006.01)
*H04L 1/18* (2006.01)
*H04J 11/00* (2006.01)
*H04B 7/155* (2006.01)
*H04L 1/00* (2006.01)

(52) U.S. Cl.
CPC .......... *H04L 1/1854* (2013.01); *H04L 5/0053* (2013.01); *H04B 7/155* (2013.01); *H04L 1/0046* (2013.01)

(56) References Cited

U.S. PATENT DOCUMENTS

| | | | |
|---|---|---|---|
| 2010/0195583 A1 | 8/2010 | Nory et al. | |
| 2010/0246721 A1 | 9/2010 | Chen et al. | |
| 2010/0275083 A1* | 10/2010 | Nam | H03M 13/6306 714/748 |
| 2010/0316096 A1 | 12/2010 | Adjakple et al. | |
| 2011/0051654 A1 | 3/2011 | Blankenship et al. | |
| 2011/0069637 A1* | 3/2011 | Liu | H04L 5/0007 370/254 |
| 2011/0085503 A1 | 4/2011 | Nam et al. | |
| 2011/0128883 A1 | 6/2011 | Chung et al. | |
| 2011/0194412 A1 | 8/2011 | Park et al. | |
| 2011/0228883 A1 | 9/2011 | Liu et al. | |
| 2011/0317615 A1 | 12/2011 | Soong et al. | |
| 2012/0294225 A1* | 11/2012 | Awad | H04B 7/15528 370/315 |
| 2012/0320782 A1 | 12/2012 | Seo et al. | |
| 2013/0294376 A1 | 11/2013 | Nakao et al. | |

FOREIGN PATENT DOCUMENTS

| | | |
|---|---|---|
| WO | WO 2010/013982 A2 | 2/2010 |
| WO | WO 2010/032053 A1 | 3/2010 |
| WO | WO 2010/032973 A2 | 3/2010 |
| WO | WO 2010/039003 A2 | 4/2010 |

OTHER PUBLICATIONS

Samsung, "R-PDCCH Interleaving in CRS mode", 3GPP TSG RAN WG1 Meeting #61bis, Agenda Item: 6.6.3, Dresden, Germany, Jun. 28-Jul. 2, 2010, pp. 1.3, R1-103681.
Samsung, "R-PDCCH multiplexing and search space", 3GPP TSG RAN WG1 Meeing #59, Agenda Item: 7.8.1.2, JeJu, Korea, Nov. 9-13, 2009, pp. 1-6. R1-094593.
ZTE, "R-PDCCH Multiplexing and Relevant Problems", TSG-RAN WG1 #60, Agenda Item: 7.5.1.2, San Francisco, USA, Feb. 22-26, 2010, pp. 2-10, R1-100975.
Panasonic, "R-PDCCH Placement," 3GPP TSG RAN WG1 Meeting #60bis, R1-102042, Beijing, China, Apr. 12-16, 2010, pp. 1-5.
Panasonic, "R-PDCCH Search Space Design," 3GPP TSG RAN WG1 Meeting #62, R1-104911, Madrid, Spain, Aug. 23-27, 2010, pp. 1-7.

* cited by examiner

FIG. 6
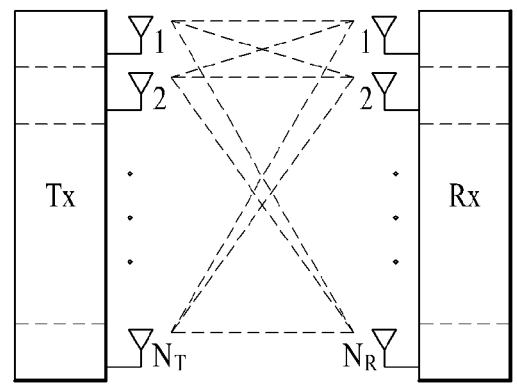
(a)
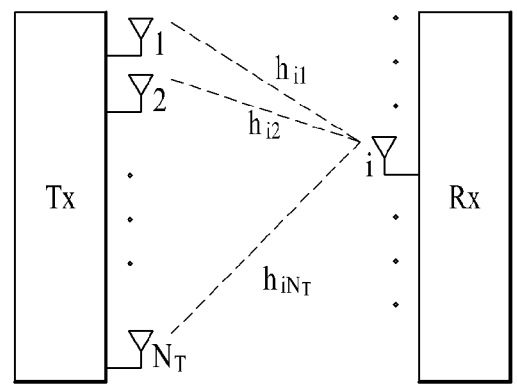
(b)

FIG. 7
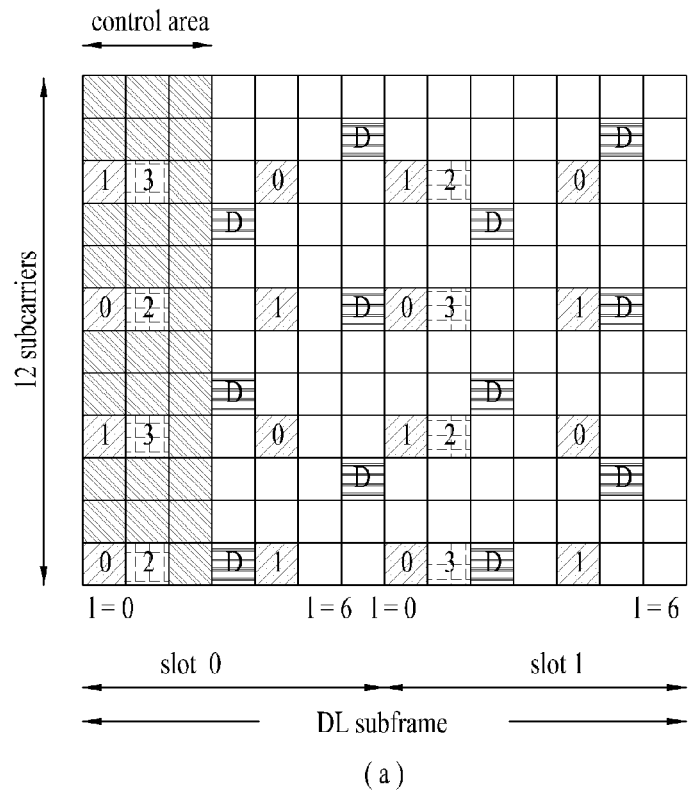
(a)
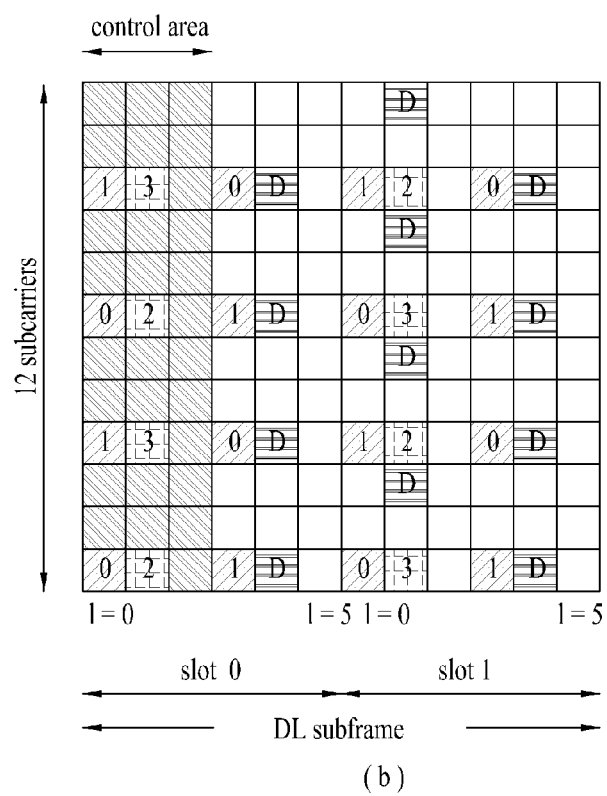
(b)

FIG. 11
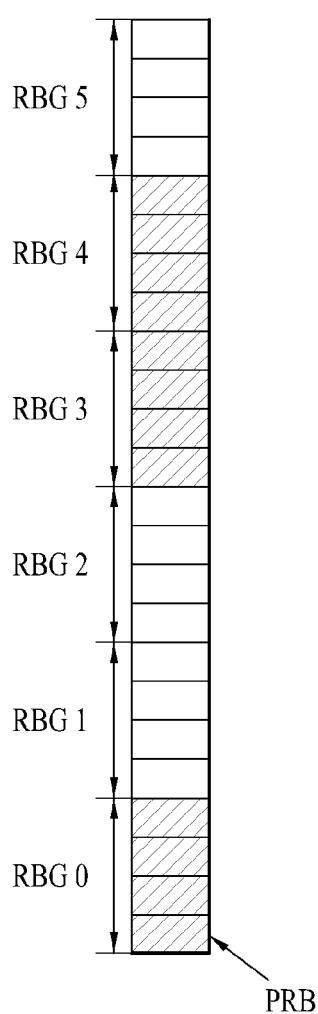
resource allocation type 0
(a)
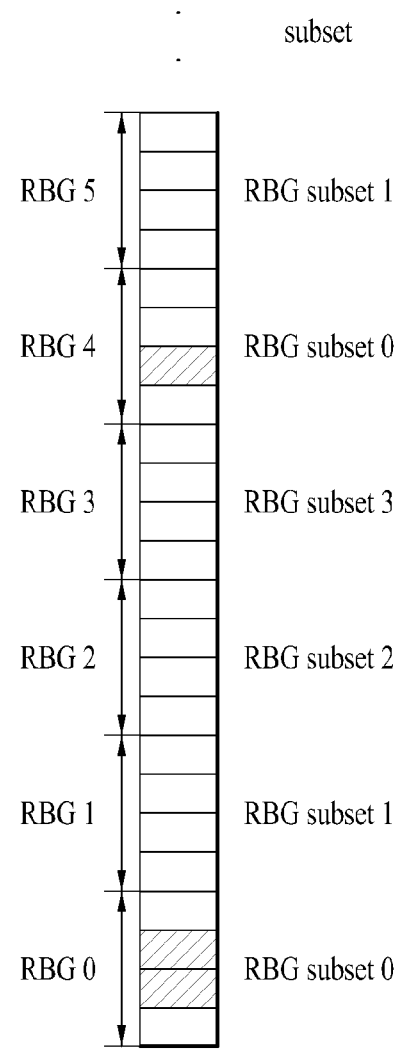
resource allocation type 1
(b)

FIG. 18

| | RBG#0 | RBG#1 | RBG#2 | RBG#3 | RBG#4 | RBG#5 | RBG#6 | RBG#7 |
|---|---|---|---|---|---|---|---|---|
| (a) search space of aggregation level 1 | | allocation | allocation | allocation | allocation | allocation | allocation | allocation |
| (b) search space of aggregation level 2 | allocation when indicator value is 0 | allocation when indicator value is 1 | allocation when indicator value is 0 | allocation when indicator value is 1 | allocation when indicator value is 0 | allocation when indicator value is 1 | allocation when indicator value is 0 | allocation when indicator value is 1 |
| (c) search space of aggregation level 4 (when indicator value of search space of aggregation level 2 is 0) | allocation when indicator value is 0 | | allocation when indicator value is 1 | | allocation when indicator value is 0 | | allocation when indicator value is 1 | |
| (d) search space of aggregation level 4 (when indicator value of search space of aggregation level 2 is 1) | | allocation when indicator value is 0 | | allocation when indicator value is 1 | | allocation when indicator value is 0 | | allocation when indicator value is 1 |

FIG. 19

| RBG#0 | RBG#1 | RBG#2 | RBG#3 | RBG#4 | RBG#5 | RBG#6 | RBG#7 |
|---|---|---|---|---|---|---|---|
| aggregation level 1, 2, 4 | aggregation level 1 | aggregation level 1, 2 | aggregation level 1 | aggregation level 1, 2, 4 | aggregation level 1 | aggregation level 1, 2 | aggregation level 1 |

. . .

METHOD AND APPARATUS FOR TRANSMITTING AND RECEIVING DOWNLINK CONTROL INFORMATION FOR REPEATER

CROSS REFERENCE TO RELATED APPLICATIONS

This application is a Continuation of U.S. patent application Ser. No. 13/580,942 filed on Aug. 23, 2012 (now U.S. Pat. No. 9,191,159 filed on Nov. 17, 2015), which is the National Stage of International Application No. PCT/KR2011/003626 filed on May 17, 2011, which claims the benefit of U.S. Provisional Application Nos. 61/345,574 filed on May 17, 2010; 61/356,547 filed on Jun. 18, 2010; 61/358,380 filed on Jun. 24, 2010; 61/366,521 filed on Jul. 21, 2010; 61/368,638 filed on Jul. 28, 2010; 61/376,680 filed Aug. 25, 2010; 61/376,694 filed on Aug. 25, 2010; 61/391,078 filed on Oct. 8, 2010. The entire contents of all of the above applications are hereby incorporated by reference.

BACKGROUND OF THE INVENTION

Field of the Invention

The following description relates to a wireless communication system and more particularly to a method and apparatus for transmitting and receiving downlink control information of a relay (or Relay Node (RN)).

Discussion of the Related Art

FIG. 1 illustrates a relay node (RN) 120 and User Equipments (UEs) 131 and 132 that are present in an area of a single base station or eNode B (eNB) 110 in a wireless communication system 100. The RN 120 may deliver data received from the eNodeB 110 to the UE 132 in the area of the RN 120 and deliver data received from the UE 132 in the area of the RN 120 to the eNodeB 110. In addition, the RN 120 may support extension of a high data rate area, an increase in the communication quality of a cell edge, and provision of communication to an area outside a service area of the eNodeB or the inside of a building. FIG. 1 illustrates that a UE such as the UE 131 which receives a service directly from the eNodeB (hereinafter referred to as a Macro-UE or M-UE) or a UE such as the UE 132 which receives a service from the RN 120 (hereinafter referred to as a Relay-UE or R-UE).

A radio link between an eNodeB and an RN is referred to as a backhaul link. A link from an eNodeB to an RN is referred to as a backhaul downlink and a link from an RN to an eNodeB is referred to as a backhaul uplink. A radio link between an RN and a UE is referred to as an access link. A link from an RN to a UE is referred to as an access downlink and a link from a UE to an RN is referred to as an access uplink.

SUMMARY OF THE INVENTION

The eNodeB may transmit downlink control information (DCI) of the RN to the RN through an RN-physical downlink control channel (PDCCH) in a backhaul downlink subframe. The DCI transmitted through the PDCCH may include downlink (DL) assignment information indicating resource allocation of downlink to the RN and uplink (UL) grant information resource allocation of uplink from the RN.

An object of the present invention is to provide a method for efficiently transmitting downlink allocation information and uplink grant information of a relay (or Relay Node (RN)) in a backhaul downlink subframe. Another object of the present invention is to provide a method for efficiently determining a search space that is set for R-PDCCH detection by a relay.

Objects of the present invention are not limited to those described above and other objects will be clearly understood by a person having ordinary knowledge in the art from the following description.

In order to solve the above problem, a method for a relay to receive downlink control information from a base station through a Relay-Physical Downlink Control Channel (R-PDCCH) according to an embodiment of the present invention may include determining a candidate position at which the R-PDCCH is transmitted in a first slot and a second slot of a downlink subframe, monitoring whether or not the R-PDCCH is being transmitted at the determined candidate position, and receiving, upon determining through the monitoring that the R-PDCCH is being transmitted, the downlink control information included in the R-PDCCH, wherein the candidate R-PDCCH position may be set as a Virtual Resource Block (VRB) set including N VRBs and one candidate R-PDCCH position of a higher aggregation level may include a combination of 2 adjacent candidate positions among candidate R-PDCCH positions of a lower aggregation level.

In order to solve the above problem, a relay for performing downlink signal in a wireless communication system according to another embodiment of the present invention may include a reception module for receiving a downlink signal from a base station, a transmission module for transmitting an uplink signal to the base station, and a processor for controlling the relay including the reception module and the transmission module, wherein the processor may be configured to determine a candidate position at which a Relay-Physical Downlink Control Channel (R-PDCCH) is transmitted in a first slot and a second slot of a downlink subframe, to monitor whether or not the R-PDCCH is being transmitted at the determined candidate position, and to receive, upon determining through the monitoring that the R-PDCCH is being transmitted, the downlink control information included in the R-PDCCH through the reception module, wherein the candidate R-PDCCH position may be set as a Virtual Resource Block (VRB) set including N VRBs and one candidate R-PDCCH position of a higher aggregation level may include a combination of 2 adjacent candidate positions among candidate R-PDCCH positions of a lower aggregation level.

The following features may be commonly applied to the embodiments according to the present invention.

The VRBs of the VRB set may be assigned numbers {n0, n1, . . . , nN−1}, starting from a lowest VRB index and ending with a highest VRB index and respective candidate R-PDCCH positions of aggregation levels L may be determined as VRBs of {n0, n1, . . . , nL−1}, {nL, nL+1, . . . , n2L−1}, {n2L, n2L+2, . . . , n3L−1}, . . . {nN−L, nN−L+1, . . . , nN−1}.

The R-PDCCH may not be interleaved with another R-PDCCH.

The candidate R-PDCCH position may be determined according to distributed VRB-to-Physical Resource Block (PRB) mapping.

The VRB set and the VRB-to-PRB mapping may be set by a higher layer signal.

The downlink control information may be downlink allocation information included in an R-PDCCH transmitted in the first slot or uplink grant information included in an R-PDCCH transmitted in the second slot.

The same VRB set may be set in the first slot and the second slot of the downlink subframe.

It is to be understood that both the foregoing general description and the following detailed description of the present invention are exemplary and explanatory and are intended to provide further explanation of the invention as claimed.

According to the present invention, it is possible to provide a method for efficiently transmitting downlink allocation information and uplink grant information of a relay (or Relay Node (RN)) in a backhaul downlink subframe. In addition, according to the present invention, it is possible to provide a method for efficiently determining a search space that is set for R-PDCCH detection by a relay.

Advantages of the present invention are not limited to those described above and other advantages will be clearly understood by a person having ordinary knowledge in the art from the following description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 illustrates a configuration of a wireless communication system;

FIG. 7 illustrates a downlink reference signal pattern defined in a 3GPP LTE system;

FIG. 11 illustrates a downlink resource allocation type;

FIG. 18 illustrates an example in which an RBG set allocated to a search space of a higher aggregation level is constructed of a subset of an RBG set allocated to a search space of a lower aggregation level;

FIG. 19 illustrates RBGs that are allocated to the search spaces of aggregation levels 1, 2, and 4;

DETAILED DESCRIPTION OF THE INVENTION

Figure 1:
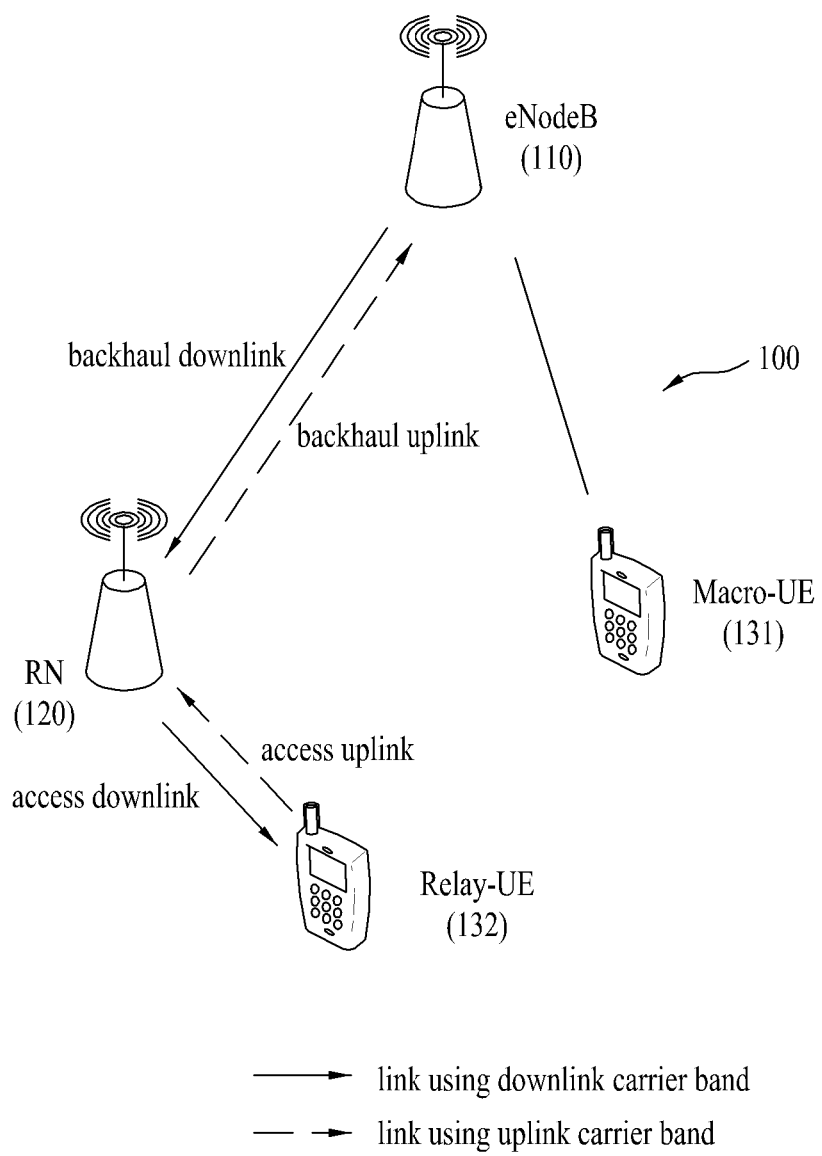
FIG. 1 illustrates a wireless communication system including an eNodeB, an RN, a UE.

The embodiments described below are provided by combining components and features of the present invention in specific forms. The components or features of the present invention can be considered optional unless explicitly stated otherwise. The components or features may be implemented without being combined with other components or features. The embodiments of the present invention may also be provided by combining some of the components and/or features. The order of the operations described below in the embodiments of the present invention may be changed. Some components or features of one embodiment may be included in another embodiment or may be replaced with corresponding components or features of another embodiment.

The embodiments of the present invention have been described focusing mainly on the data communication relationship between a terminal and a Base Station (BS). The BS is a terminal node in a network which performs communication directly with the terminal. Specific operations which have been described as being performed by the BS may also be performed by an upper node as needed.

That is, it will be apparent to those skilled in the art that the BS or any other network node may perform various operations for communication with terminals in a network including a number of network nodes including BSs. Here, the term "base station (BS)" may be replaced with another term such as "fixed station", "Node B", "eNode B (eNB)", or "access point". The term "relay" may be replaced with another term "Relay Node (RN)" or "Relay Station (RS)". The term "terminal" may also be replaced with another term such as "User Equipment (UE)", "Mobile Station (MS)", "Mobile Subscriber Station (MSS)", or "Subscriber Station (SS)".

Specific terms used in the following description are provided for better understanding of the present invention and can be replaced with other terms without departing from the spirit of the present invention.

In some instances, known structures and devices are omitted or shown in block diagram form, focusing on important features of the structures and devices, so as not to obscure the concept of the present invention. The same reference numbers will be used throughout this specification to refer to the same or like parts.

The embodiments of the present invention can be supported by standard documents of at least one of the IEEE 802 system, the 3GPP system, the 3GPP LTE system, the LTE-Advanced (LTE-A) system, and the 3GPP2 system which are wireless access systems. That is, steps or portions that are not described in the embodiments of the present invention for the sake of clearly describing the spirit of the present invention can be supported by the standard documents. For all terms used in this disclosure, reference can be made to the standard documents.

Technologies described below can be used in various wireless access systems such as a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system. CDMA may be implemented with a radio technology such as Universal Terrestrial Radio Access (UTRA) or CDMA2000. TDMA may be implemented with a radio technology such as Global System for Mobile communication (GSM), General Packet Radio Service (GPRS), or Enhanced Data rates for GSM Evolution (EDGE). OFDMA may be implemented with a radio technology such as IEEE 802.11 (Wi-Fi), IEEE 802.16 (WiMAX), IEEE 802.20, or Evolved-UTRA (E-UTRA). UTRA is a part of Universal Mobile Telecommunication System (UMTS). 3rd Generation Partnership Project (3GPP) Long Term Evolution (LTE) is a part of Evolved-UMTS (E-UMTS) that uses E-UTRA. 3GPP LTE employs OFDMA for downlink and employs SC-FDMA for uplink. LTE-Advanced (LTE-A) is an evolution of 3GPP LTE. WiMAX can be explained by IEEE 802.16e standard (WirelessMAN-OFDMA Reference System) and advanced IEEE 802.16m standard (WirelessMAN-OFDMA advanced system). Although the present invention will be described below mainly with reference to 3GPP LTE and 3GPP LTE-A systems for the sake of clarification, the technical spirit of the present invention is not limited to the 3GPP LTE and LTE-A systems.

Figure 2:
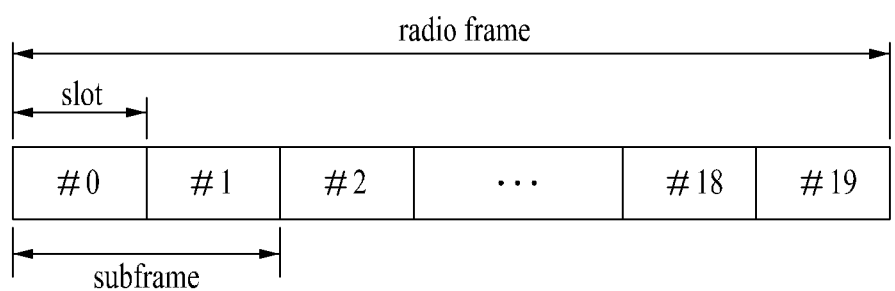
FIG. 2 illustrates a structure of a radio frame used in a 3GPP LTE system.

FIG. 2 illustrates the structure of a radio frame used in the 3GPP LTE system. A radio frame includes 10 subframes and each subframe includes 2 slots in the time domain. A unit time in which one subframe is transmitted is defined as a Transmission Time Interval (TTI). For example, one subframe may have a length of 1 ms and one slot may have a length of 0.5 ms. One slot may include a plurality of OFDM symbols in the time domain. Because the 3GPP LTE system uses OFDMA in downlink, an OFDM symbol represents one symbol period. One symbol may be referred to as an SC-FDMA symbol or a symbol period in uplink. A Resource Block (RB) is a resource allocation unit which includes a plurality of consecutive subcarriers in a slot. This radio frame structure is purely exemplary. Thus, the number of subframes included in a radio frame, the number of slots included in a subframe, or the number of OFDM symbols included in a slot may vary in various ways.

Figure 3:
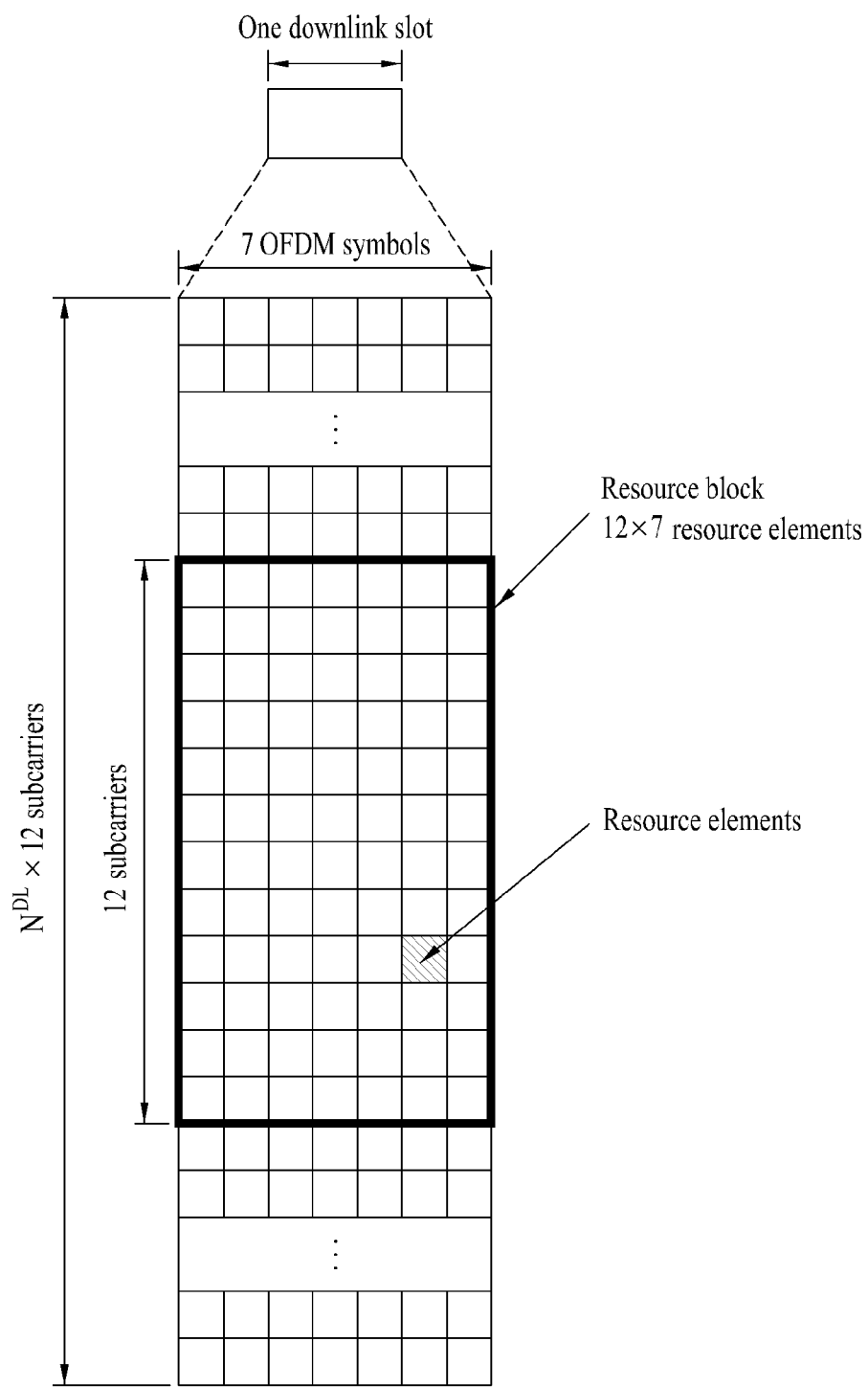
FIG. 3 illustrates a resource grid in a downlink slot.

FIG. 3 illustrates a resource grid in a downlink slot. Although one downlink slot includes 7 OFDM symbols in the time domain and one RB includes 12 subcarriers in the frequency domain in the example of FIG. 3, the present invention is not limited to this example. For example, one slot may include 6 OFDM symbols when extended CPs are applied while one slot includes 7 OFDM symbols when normal Cyclic Prefixes (CPs) are applied. Each element on the resource grid is referred to as a resource element (RE). One resource block (RB) includes 12×7 resource elements. The number of RBs (NDL) included in one downlink slot is determined based on a downlink transmission bandwidth. The structure of the uplink slot may be identical to the structure of the downlink slot.

Figure 4:
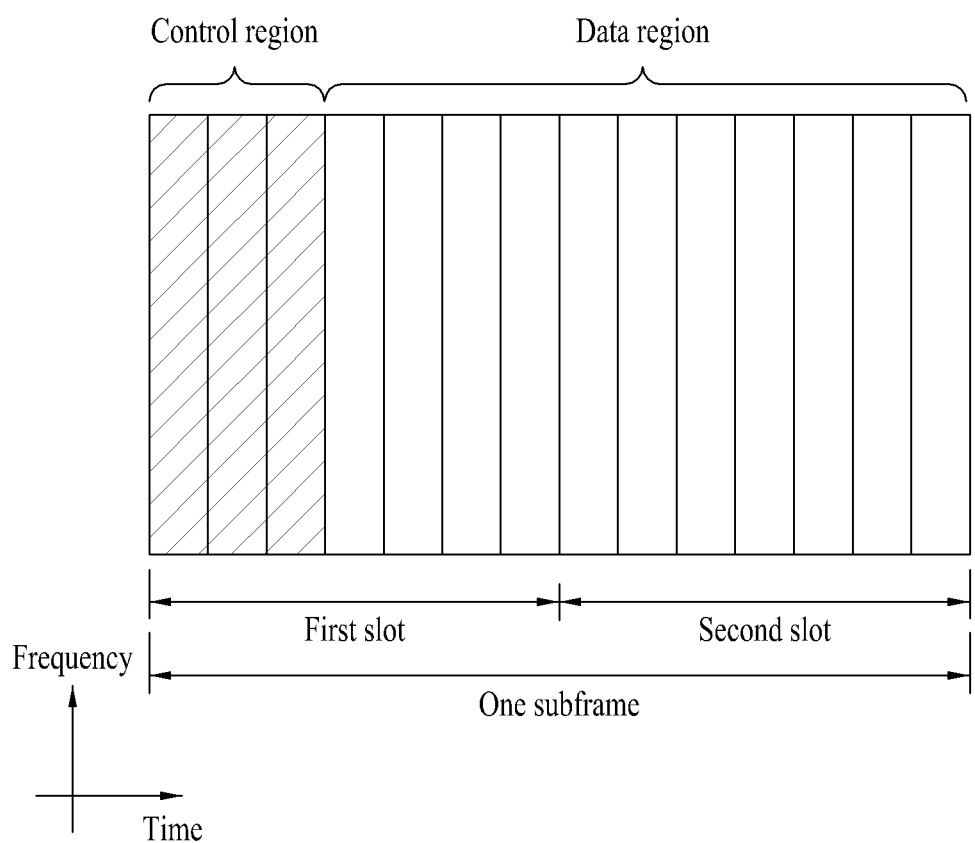
FIG. 4 illustrates a structure of a downlink subframe.

FIG. 4 illustrates the structure of a downlink subframe. Up to the first 3 OFDM symbols of a first slot within one subframe correspond to a control area to which a control channel is allocated. The remaining OFDM symbols correspond to a data area to which a Physical Downlink Shared Channel (PDSCH) is allocated. Downlink control channels used in the 3GPP LTE system include, for example, a Physical Control Format Indicator Channel (PCFICH), a Physical Downlink Control Channel (PDCCH), and a Physical Hybrid automatic repeat request Indicator Channel (PHICH). The PCFICH is transmitted in the first OFDM symbol of a subframe and includes information regarding the number of OFDM symbols used to transmit a control channel in the subframe. The PHICH includes a HARQ ACK/NACK signal as a response to uplink transmission. Control information transmitted through the PDCCH is referred to as Downlink Control Information (DCI). The DCI includes uplink or downlink scheduling information or includes an uplink transmission power control command for a UE group. The PDCCH may include a resource allocation and transmission format of a Downlink Shared Channel (DL-SCH), resource allocation information of an Uplink Shared Channel (UL-SCH), paging information of a Paging Channel (PCH), system information of the DL-SCH, information regarding resource allocation of a higher layer control message such as a Random Access Response (RAR) that is transmitted in the PDSCH, a set of transmission power control commands for individual UEs in a UE group, transmission power control information, and information regarding activation of Voice over IP (VoIP). A plurality of PDCCHs may be transmitted within the control area. The UE may monitor the plurality of PDCCHs. The PDCCHs are transmitted in an aggregation of one or more consecutive Control Channel Elements (CCEs). Each CCE is a logical allocation unit that is used to provide the PDCCHs at a coding rate based on the state of a radio channel. The CCE corresponds to a plurality of resource element groups. The format of the PDCCH and the number of available bits are determined based on a correlation between the number of CCEs and a coding rate provided by the CCEs. The number of CCEs that are used to transmit a PDCCH is referred to as an aggregation level. The CCE aggregation level is a CCE unit for searching for a PDCCH. The size of the CCE aggregation level is defined as the number of adjacent CCEs. For example, the CCE aggregation level may be 1, 2, 4, or 8.

The base station (eNB) determines the PDCCH format according to a DCI that is transmitted to the UE, and adds a Cyclic Redundancy Check (CRC) to control information. The CRC is masked with a Radio Network Temporary Identifier (RN TI) according to the owner or usage of the PDCCH. If the PDCCH is associated with a specific UE, the CRC may be masked with a cell-RNTI (C-RNTI) of the UE. If the PDCCH is associated with a paging message, the CRC may be masked with a paging indicator identifier (P-RNTI). If the PDCCH is associated with system information (more specifically, a system information block (SIB)), the CRC may be masked with a system information identifier and a system information RNTI (SI-RNTI). To indicate a random access response that is a response to transmission of a random access preamble from the UE, the CRC may be masked with a random access-RNTI (RA-RNTI).

Figure 5:
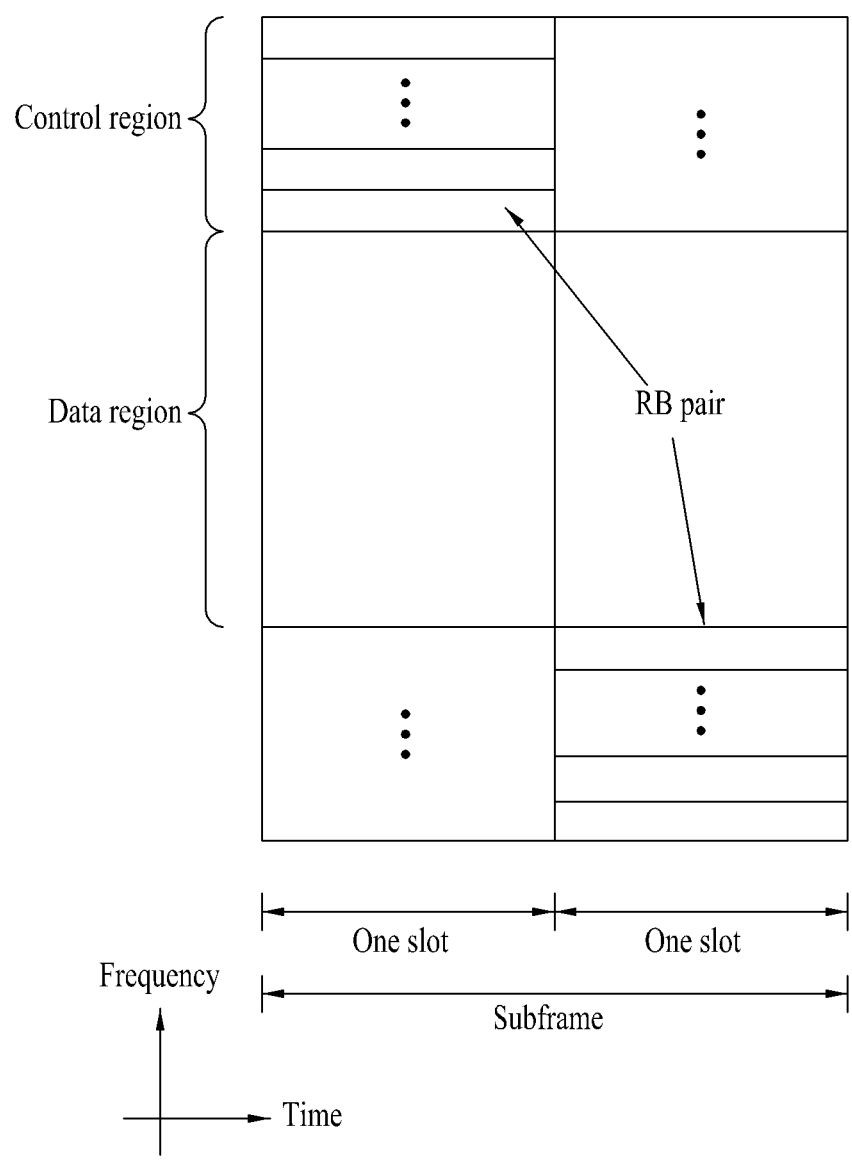
FIG. 5 illustrates a structure of an uplink subframe.

FIG. 5 illustrates the structure of an uplink subframe. The uplink subframe may be divided into a control area and a data area in the frequency domain. A Physical Uplink Control Channel (PUCCH) including uplink control information is allocated to the control area. A Physical Uplink Shared Channel (PUSCH) including user data is allocated to the data area. In order to maintain single carrier properties, one UE does not simultaneously transmit the PUCCH and the PUSCH. A PUCCH associated with one UE is allocated to an RB pair in a subframe. RBs belonging to the RB pair occupy different subcarriers in two slots. That is, the RB pair allocated to the PUCCH is "frequency-hopped" at a slot boundary.

Modeling of Multi-Input Multi-Output (MIMO) System

FIG. 6 is a diagram showing the configuration of a wireless communication system having multiple antennas.

As shown in FIG. 6(*a*), if the number of transmit antennas is increased to NT and the number of receive antennas is increased to NR, a theoretical channel transmission capacity is increased in proportion to the number of antennas unlike when a plurality of antennas is used only in a transmitter or a receiver. Accordingly, it is possible to improve transfer rate and to remarkably improve frequency efficiency. As the channel transmission capacity is increased, the transfer rate may be theoretically increased by the product of the maximum transfer rate R0 when a single antenna is used and a rate increase ratio Ri.

$$R_i = \min(N_T, N_R) \qquad \text{Expression 1}$$

For example, in an MIMO system using four transmit antennas and four receive antennas, it is possible to theoretically acquire a transfer rate which is four times that of a single antenna system. After theoretical capacity increase of the multi-antenna system was proven in the mid-90s, various technologies for actually improving data transfer rate have been vigorously studied. In addition, some of such technologies have already been applied to various wireless communication standards such as third-generation mobile communication and next-generation wireless LAN.

Multi-antenna related studies have been conducted in various aspects, such as study of information theory associated with multi-antenna communication capacity calculation in various channel environments and multiple access environments, study of wireless channel measurement and model derivation of a multi-antenna system, study of time-space processing technology for improving transfer rate.

The communication method of the MIMO system will be described in more detail using mathematical modeling. In the above system, it is assumed that $N_T$ transmit antennas and $N_R$ receive antennas are present.

The maximum number of pieces of information that can be transmitted through transmission signals is $N_T$ if $N_T$ transmit antennas are present. The transmitted information may be expressed as follows.

$$s = [s_1, s_2, \ldots, s_{N_T}]^T \qquad \text{Expression 2}$$

The transmitted information $S_1, S_2, \ldots, S_{N_T}$ may have different transmission powers. If the respective transmission powers are $P_1, P_2, \ldots, P_{N_T}$, the transmitted information with adjusted powers may be expressed as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{Expression 3}$$

In addition, $\hat{S}$ may be expressed using a diagonal matrix P of the transmission powers as follows.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{Expression 4}$$

Let us consider that the NT actually transmitted signals $x_1, x_2, \ldots, x_{N_T}$ are configured by applying a weight matrix W to the information vector $\hat{S}$ with the adjusted transmission powers. The weight matrix W serves to appropriately distribute the transmitted information to each antenna according to the state of a transport channel or the like. $x_1, x_2, \ldots, x_{N_T}$ may be expressed using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{22} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & \ddots & \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \qquad \text{Expression 5}$$

$$W\hat{s} = WPs,$$

where $W_{ij}$ denotes a weight between an i-th transmit antenna and j-th information. W is also referred to as a precoding matrix.

If NR receive antennas are present, respective received signals $y_1, y_2, \ldots, y_{N_R}$ of the antennas are expressed as follows.

$$y = [y_1, y_2, \ldots, y_{N_R}]^T \qquad \text{Expression 6}$$

If channels are modeled in the MIMO wireless communication system, the channels may be distinguished according to transmit and receive antenna indexes. Let hij represent a channel from the transmit antenna j to the receive antenna i. Note that the indexes of the receive antennas precede the indexes of the transmit antennas in hij.

FIG. 6(*b*) is a diagram showing channels from the NT transmit antennas to the receive antenna i. The channels may be combined and expressed in the form of a vector and a matrix. In FIG. 6(*b*), the channels from the NT transmit antennas to the receive antenna i may be expressed as follows.

$$h_i^T = [h_{i1}, h_{i2}, \ldots, h_{iN_T}] \qquad \text{Expression 7}$$

Accordingly, all the channels from the NT transmit antennas to the NR receive antennas may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \qquad \text{[Expression 8]}$$

An Additive White Gaussian Noise (AWGN) is added to the actual channels after the channels undergo a channel matrix H. The AWGN $n_1, n_2, \ldots, n_{N_R}$ added to the NT transmit antennas may be expressed as follows.

$$n = [n_1, n_2, \ldots, n_{N_R}]^T \qquad \text{Expression 9}$$

Through the above-described mathematical modeling, the received signals may be expressed as follows.

$$y =$$

$$\begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \qquad \text{Expression 10}$$

$$Hx + n$$

The number of rows and columns of the channel matrix H indicating the channel state is determined by the number of transmit and receive antennas. The number of rows of the channel matrix H is equal to the number NR of receive antennas and the number of columns thereof is equal to the number NT of transmit antennas. That is, the channel matrix H is an NR×NT matrix.

The rank of the matrix is defined as the smallest number of rows or columns which are independent of each other. Accordingly, the rank of the matrix cannot be greater than the number of rows or columns of the matrix. The rank rank(H) of the channel matrix H is restricted as follows.

$$\text{rank}(H) \leq \min(N_T, N_R) \qquad \text{Expression 11}$$

When the matrix is subjected to Eigen value decomposition, the rank may be defined as the number of Eigen values excluding 0. Similarly, the rank may also be defined as the number of singular values excluding 0 when the matrix is subjected to singular value decomposition. Accordingly, the physical meaning of the rank in the channel matrix may be considered the maximum number of different pieces of information that can be transmitted in a given channel.

Reference Signal (RS)

In a wireless communication system, a signal may be distorted during transmission since packets are transmitted through a radio channel. In order to enable a receiving side to correctly receive the distorted signal, distortion of the received signal should be corrected using channel information. A method of transmitting a signal, of which both the transmitting side and the receiving side are aware, and determining channel information using the degree of distortion that has occurred when the signal is received through a channel is mainly used to determine the channel information. This signal is referred to as a pilot signal or a reference signal (RS).

When data is transmitted and received using multiple antennas, channel states between the transmit antennas and the receive antennas should be determined to correctly receive the signal. Accordingly, an individual RS should be present for each transmit antenna.

A downlink RS is classified into a Common RS (CRS) shared among all UEs in a cell and a Dedicated RS (DRS) only for a specific UE. Information for channel estimation and demodulation may be provided using such RSs.

The receiving side (UE) may estimate the state of a channel from the CRS and may feed an indicator associated with the quality of the channel, such as a Channel Quality Indicator (CQI), a Precoding Matrix Index (PMI) and/or a Rank Indicator (RI), back to the transmitting side (eNodeB). The CRS may also be referred to as a cell-specific RS. Alternatively, an RS associated with the feedback of Channel State Information (CSI) such as CQI/PMI/RI may be separately defined as a CSI-RS.

The DRS may be transmitted through REs when data demodulation of a PDSCH is necessary. The UE may receive information indicating the presence or absence of the DRS from a higher layer and receive information as to whether or not the DRS is valid only when a PDSCH is mapped to the DRS. The DRS may also be referred to as a UE-specific RS or a Demodulation RS (DMRS).

FIG. 7 is a diagram showing a pattern of mapping of CRSs and DRSs onto a downlink RB pair defined in the existing 3GPP LTE system (e.g., Release-8). The downlink RB pair as a mapping unit of the RSs may be expressed in units of one subframe on the time domain×12 subcarriers on the frequency domain. That is, on the time axis, one RB pair has a length of 14 OFDM symbols in the case of the normal CP (FIG. 7(a)) and has a length of 12 OFDM symbols in the case of the extended CP (FIG. 7(b)).

FIG. 7 shows the locations of RSs on an RB pair in the system in which an eNodeB supports four transmit antennas. In FIG. 7, Resource Elements (REs) denoted by "0", "1", "2" and "3" indicate the locations of CRSs of the antenna port indexes 0, 1, 2 and 3, respectively. In FIG. 7, the RE denoted by "D" indicates the location of a DRS.

Hereinafter, the CRS will be described in detail.

The CRS is used to estimate the channel of a physical antenna and is distributed over the entire band as an RS which can be commonly received by all UEs located within a cell. The CRS may be used for CSI acquisition and data demodulation.

The CRS is defined in various formats according to the antenna configuration of the transmitting side (eNodeB). The 3GPP LTE (e.g., Release-8) system supports various antenna configurations, and a downlink signal transmitting side (eNodeB) has three antenna configurations such as a single antenna, two transmit antennas and four transmit antennas. When the eNodeB performs single-antenna transmission, RSs for a single antenna port are arranged. When the eNodeB performs two-antenna transmission, RSs for two antenna ports are arranged according to a Time Division Multiplexing (TDM) and/or Frequency Division Multiplexing (FDM) scheme. That is, RSs for two antenna ports are arranged in different time resources and/or different frequency resources such that the RSs for the two antenna ports can be distinguished from each other. In addition, when the eNodeB performs four-antenna transmission, RSs for four antenna ports are arranged according to the TDM/FDM scheme. The channel information estimated by the downlink signal receiving side (UE) through the CRSs may be used to demodulate data transmitted using a transmission scheme such as single antenna transmission, transmit diversity, closed-loop spatial multiplexing, open-loop spatial multiplexing, or Multi-User MIMO (MU-MIMO).

When RSs are transmitted through a certain antenna port in the case in which multiple antennas are supported, the RSs are transmitted at the locations of REs specified according to the RS pattern and no signal is transmitted at the locations of REs specified for another antenna port.

The rule of mapping the CRSs to the RBs is defined by Expression 12.

$$k = 6m + (v + v_{shift}) \bmod 6 \qquad \text{Expression 12}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 0 \text{ and } l = 0 \\ 0 & \text{if } p = 0 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Expression 12, k denotes a subcarrier index, l denotes a symbol index, and p denotes an antenna port index. $N_{symb}^{DL}$ denotes the number of OFDM symbols of one downlink slot, $N_{RB}^{DL}$ denotes the number of RBs allocated to the downlink, ns denotes a slot index, and $N_{ID}^{cell}$ denotes a cell ID. "mod" indicates a modulo operation. The location of the RS in the frequency domain depends on a value Vshift. Since the value Vshif depends on the cell ID, the location of the RS has a frequency shift value which is different for each cell.

More specifically, in order to increase channel estimation performance through the CRSs, the locations of the CRSs in the frequency domain may be shifted so as to be changed according to the cells. For example, if RSs are located at intervals of three subcarriers, RSs may be arranged at 3k-th subcarriers in one cell while RSs may be arranged at (3k+1)-th subcarriers in another cell. From the viewpoint of one antenna port, RSs are arranged at intervals of 6 REs (that is, at intervals of 6 subcarriers) in the frequency domain while being separated from REs, on which RSs allocated to another antenna port are arranged, by 3 REs in the frequency domain.

In addition, power boosting may be applied to CRSs. Power boosting indicates that power of REs other than REs allocated for RSs among the REs of one OFDM symbol is used to transmit RSs with higher power.

In the time domain, RSs are arranged at specific time intervals, starting from a symbol index (l=0) of each slot. The time interval between each RS is defined differently according to the CP length. RSs are located at symbol indexes 0 and 4 of the slot in the case of the normal CP and are located at symbol indexes 0 and 3 of the slot in the case of the extended CP. RSs for only up to two antenna ports are defined in one OFDM symbol. Accordingly, in the case of four-transmit antenna transmission, RSs for the antenna ports 0 and 1 are located at symbol indexes 0 and 4 (symbol indexes 0 and 3 in the case of the extended CP) of the slot and RSs for the antenna ports 2 and 3 are located at the symbol index 1 of the slot. The frequency locations of the RSs for the antenna ports 2 and 3 in the frequency domain are switched with each other in the second slot.

In order to support spectrum efficiency higher than that of the existing 3GPP LTE (e.g., Release-8) system, a system (e.g., an LTE-A system) having an extended antenna configuration may be designed. The extended antenna configuration may be, for example, an 8-transmit-antenna configuration. A system having the extended antenna configuration needs to support UEs which operate in the existing antenna configuration, that is, needs to support backward compatibility. Accordingly, it is necessary to support an RS pattern according to the existing antenna configuration and to design a new RS pattern for an additional antenna configuration. If CRSs for new antenna ports are added to the system having the existing antenna configuration, there is a problem in that RS overhead is significantly increased, thereby reducing data transfer rate. In consideration of such circumstances, an LTE-A (Advanced) system which is an evolution of the 3GPP LTE system may adopt additional RSs (CSI-RSs) for measuring the CSI for the new antenna ports.

Hereinafter, the DRS will be described in detail.

The DRS (or the UE-specific RS) is used to demodulate data. A precoding weight used for a specific UE when multi-antenna transmission is performed is also used for an RS without change so as to allow the UE to estimate an equivalent channel, into which a transfer channel and the precoding weight transmitted from each transmit antenna are combined, when the UE receives the RSs.

The existing 3GPP LTE system (e.g., Release-8) supports transmission of up to 4 transmit antennas and defines the DRS for Rank 1 beamforming. The DRS for Rank 1 beamforming is also represented by an RS for antenna port index 5. The rule of mapping of the DRS onto an RB is defined by Expressions 13 and 14. Expression 13 represents the mapping rule for the normal CP and Expression 14 represents the mapping rule for the extended CP.

$$k = (k') \bmod N_{sc}^{RB} + N_{sc}^{RB} \cdot n_{PRB} \qquad \text{Expression 13}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \qquad \text{Expression 14}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Expressions 13 and 14, k denotes a subcarrier index, l denotes a symbol index, and p denotes an antenna port index. $N_{SC}^{RB}$ denotes the resource block size in the frequency domain and is expressed as the number of subcarriers. $n_{PRB}$ denotes a physical resource block number. $N_{RB}^{PDSCH}$ denotes the bandwidth of the RB of PDSCH transmission. ns denotes a slot index, and $N_{ID}^{cell}$ denotes a cell ID. mod indicates a modulo operation. The location of the RS in the frequency domain depends on a value Vshift. Since the value Vshif depends on the cell ID, the location of the RS has a frequency shift value which is different for each cell.

In the LTE-A system which is an evolution of the 3GPP LTE system, high-order MIMO, multi-cell transmission, evolved MU-MIMO or the like are under consideration. DRS-based data demodulation is being considered in order to support efficient RS management and an advanced transmission scheme. That is, separately from the DMRS (antenna port index 5) for Rank 1 beamforming defined in the existing 3GPP LTE (e.g., Release-8) system, DMRSs for two or more layers may be defined in order to support data transmission through the added antenna. Such DMRSs may be defined such that the DMRSs are present only in RBs and layers in which downlink transmission has been scheduled by the eNodeB.

Cooperative Multi-Point (CoMP)

According to the advanced system performance requirements of the 3GPP LTE-A system, CoMP transmission/reception technology (which may be referred to as co-MIMO, collaborative MIMO or network MIMO) has been suggested. The CoMP technology can increase the performance of the UE located at a cell edge and increase average sector throughput.

In general, in a multi-cell environment whose frequency reuse factor is 1, the performance of the UE located at the cell edge and average sector throughput may be reduced due to Inter-Cell Interference (ICI). In order to reduce the ICI, the existing LTE system applies a method in which a UE located at a cell edge acquires appropriate throughput and performance using a simple passive scheme such as Fractional Frequency Reuse (FFR) through UE-specific power control in an environment restricted by interference. However, rather than decreasing the use of frequency resources per cell, it may be preferable that the ICI be reduced or the UE reuse the ICI as a desired signal. A CoMP transmission scheme may be applied in order to accomplish such an object.

The CoMP scheme which is applicable to downlink may be largely classified into a Joint Processing (JP) scheme and a Coordinated Scheduling/Beamforming (CS/CB) scheme.

In the JP scheme, each point (eNodeB) of a CoMP unit may use data. The CoMP unit is a set of eNodeBs used in the CoMP scheme. The JP scheme may be classified into a joint transmission scheme and a dynamic cell selection scheme.

The joint transmission scheme is a method in which a PDSCH is simultaneously transmitted from a plurality of points (all or part of the CoMP unit). That is, data destined for a single UE may be simultaneously transmitted from a plurality of transmission points. According to the joint transmission scheme, it is possible to coherently or non-coherently improve the quality of received signals and to actively eliminate interference with another UE.

The dynamic cell selection scheme is a method in which a PDSCH is transmitted from one point (of the CoMP unit). That is, data destined for a single UE is transmitted from one point at a specific time and the other points in the CoMP unit do not transmit data to the UE at that time. The point for transmitting the data to the UE may be dynamically selected.

According to the CS/CB scheme, CoMP units may cooperatively perform beamforming of data transmission to a single UE. Here, although only the serving cell transmits data, user scheduling/beamforming may be determined by coordination of the cells of the CoMP unit.

In uplink, the term "coordinated multi-point reception" refers to reception of a signal transmitted by coordination of a plurality of geographically separated points. The CoMP scheme which is applicable to uplink may be classified into Joint Reception (JR) an Coordinated Scheduling/Beamforming (CS/CB).

The JR scheme is a method in which a plurality of reception points receives a signal transmitted through a PUSCH, the CS/CB scheme is a method that only one point receives a PUSCH and user scheduling/beamforming is determined by the coordination of the cells of the CoMP unit.

Sounding RS (SRS)

An SRS is used to enable an eNodeB to measure channel quality to perform frequency-selective scheduling in uplink and is not associated with uplink data and/or control information transmission. However, the present invention is not limited to this and an SRS may also be used to support advanced power control or various start-up functions of UEs which have not been recently scheduled. Examples of the start-up functions may include, for example, initial Modulation and Coding Scheme (MCS), initial power control for data transmission, timing advance, and frequency-semi-selective scheduling (which is a scheduling scheme in which a frequency resource is selectively allocated in a first slot of a subframe and is pseudo-randomly hopped to a different frequency in a second slot).

In addition, the SRS may be used for downlink channel quality measurement on the assumption that a radio channel is reciprocal between uplink and downlink. This assumption is valid particularly in a Time Division Duplex (TDD) system in which the uplink and downlink shares the same frequency band and are discriminated from each other in the time domain.

A subframe through which an SRS is transmitted by a certain UE within a cell is indicated by a cell-specific broadcast signaling. 4-bit cell-specific "srsSubframeConfiguration" parameter indicates 15 possible configurations of the subframe through which the SRS can be transmitted within each radio frame. Through such configurations, it is possible to provide flexibility enabling SRS overhead to be adjusted according to a network arrangement scenario. The remaining one (sixteenth) configuration of the parameters corresponds to switch-off (or deactivation) of SRS transmission within the cell and may be suitable, for example, for a serving cell of high-speed UEs.

Figure 8:
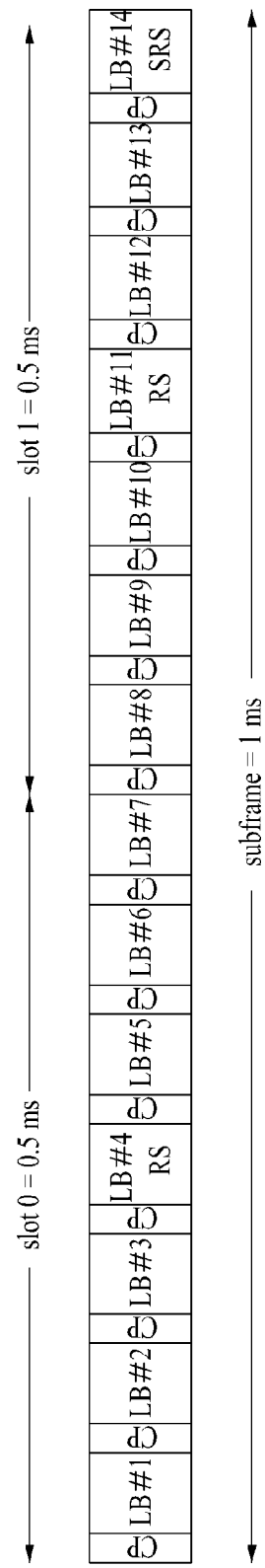
FIG. 8 illustrates reference signal transmission in an uplink subframe.

As shown in FIG. 8, an SRS is always transmitted in the last SC-FDMA symbol of the configured subframe. Accordingly, an SRS and a Demodulation RS (DMRS) are located in different SC-FDMA symbols. PUSCH data is not allowed to be transmitted in an SC-FDMA symbol designated for SRS transmission and thus sounding overhead does not exceed approximately 7% even when it is highest (that is, even when SRS transmission symbols are present in all subframes).

Each SRS symbol is generated from a basic sequence (i.e., a random sequence or Zadoff-Chu (ZC)-based sequence set) with respect to a given time unit and frequency band and all UEs within the cell use the same basic sequence. Here, SRS transmissions of a plurality of UEs within a cell in the same time unit and the same frequency band are orthogonally discriminated from each other by different cyclic shifts of the base sequence allocated to the plurality of UEs. Although SRS sequences of different cells can be discriminated from each other by allocating different basic sequences to the cells, orthogonality between different basic sequences is not guaranteed.

Relay Node (RN)

An RN may be considered, for example, for enlargement of high data rate coverage, improvement of group mobility, temporary network deployment, improvement of cell edge throughput and/or provision of network coverage to a new area.

Referring back to FIG. 1, an RN 120 serves to forward data transmitted or received between the eNodeB 110 and the UE 131 and two types of links (a backhaul link and an access link) having different attributes are applied to the respective carrier frequency bands for the eNodeB 110 and the UE 132. The eNodeB 110 may include a donor cell. The RN 120 is wirelessly connected to a radio access network through the donor cell 110

The backhaul link between the eNodeB 110 and the RN 120 may be expressed as a backhaul downlink if the backhaul link uses downlink frequency bands or downlink subframe resources and may be expressed as a backhaul uplink if the backhaul link uses uplink frequency bands or uplink subframe resources. Here, the frequency band is a resource allocated in a Frequency Division Duplex (FDD) mode and the subframe is a resource allocated in a Time Division Duplex (TDD) mode. Similarly, the access link between the RN 120 and the UE(s) 131 may be expressed as an access downlink if the access link uses downlink frequency bands or downlink subframe resources and may be expressed as an access uplink if the access link uses uplink frequency bands or uplink subframe resources. FIG. 1 shows setting of the backhaul uplink/downlink and the access uplink/downlink of an FDD-mode RN.

The eNodeB needs to have functions such as uplink reception and downlink transmission and the UE needs to have functions such as uplink transmission and downlink reception. The RN needs to have all functions such as backhaul uplink transmission to the eNodeB, access uplink reception from the UE, backhaul downlink reception from the eNodeB, and access downlink transmission to the UE.

Figure 9:
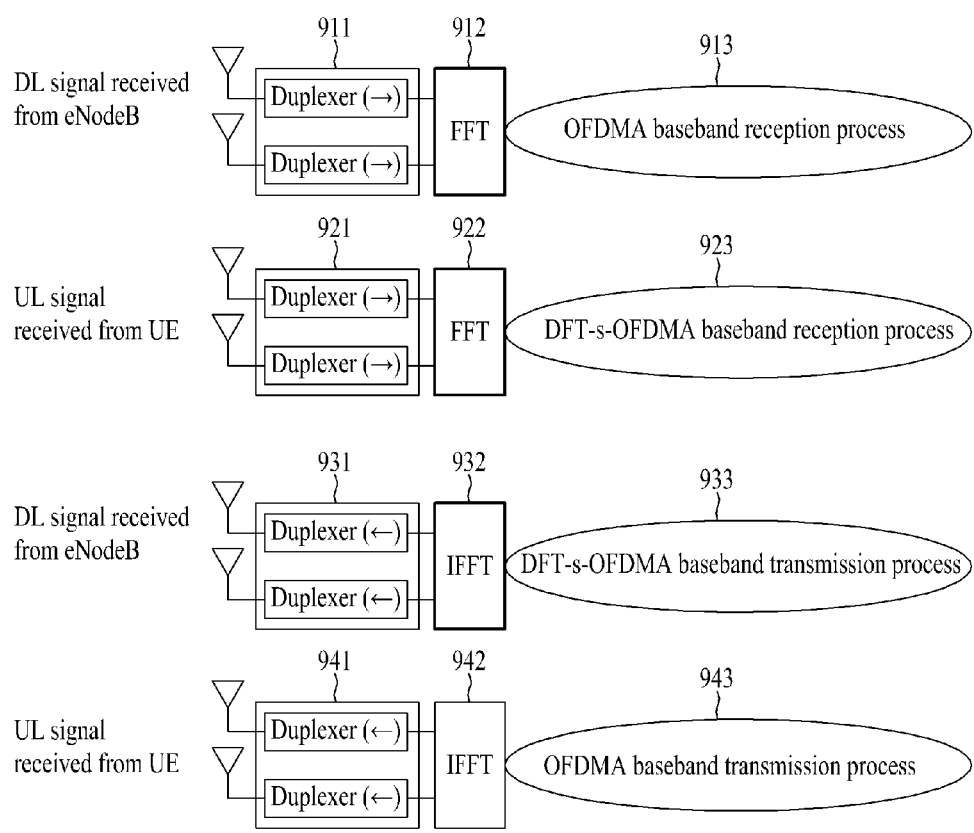
FIG. 9 illustrates exemplary implementation of transmission and reception functions of an FDD mode RN.

FIG. 9 illustrates exemplary implementation of transmission and reception functions of the FDD mode RN. The following is a conceptual description of the reception function of the RN. A downlink received signal from an eNodeB is delivered to a Fast Fourier Transform (FFT) module 912 via a duplexer 911 and an OFDMA baseband reception process 913 is performed. An uplink received signal from a UE is delivered to an FFT module 922 via a duplexer 921 and a Discrete Fourier Transform-spread-OFDMA (DFT-s-OFDMA) baseband reception process 923 is performed. The process of receiving a downlink signal from the eNodeB and the process of receiving an uplink signal from the UE may be simultaneously performed in parallel. The following is a conceptual description of the transmission function of the RN. An uplink signal is transmitted to the eNodeB through a DFT-s-OFDMA baseband transmission process 933, an Inverse FFT (IFFT) module 932, and a duplexer 931. A downlink signal is transmitted to the UE through an OFDM baseband transmission process 943, an IFFT module 942, and a duplexer 941. The process of transmitting an uplink signal to the eNodeB and the process of transmitting a downlink signal to the UE may be simultaneously performed in parallel. The illustrated one-way duplexers may be implemented as a single bidirectional duplexer. For example, the duplexer 911 and the duplexer 931 may be implemented as a single bidirectional duplexer and the duplexer 921 and the duplexer 941 may be implemented as a single bidirectional duplexer. The single bidirectional duplexer may be implemented such that the lines of an IFFT module and a baseband process module associated with transmission and reception in a specific carrier frequency band are branched from the bidirectional duplex.

The case in which a band (or spectrum) of the RN is used when the backhaul link operates in the same frequency band as the access link is referred to as "in-band" and the case in which a band (or spectrum) of the RN is used when the backhaul link and the access link operate in different frequency bands is referred to as an "out-band". In both in-band and out-band cases, a UE which operates according to the existing LTE system (e.g., Release-8) (hereinafter, referred to as a legacy UE) needs to be able to be connected to the donor cell.

The RN may be classified into a transparent RN or a non-transparent RN depending on whether or not the UE recognizes the RN. The term "transparent" indicates that the UE cannot determine whether or not the UE is performing communication with the network through the RN and the term "non-transparent" indicates that the UE can determine whether or not the UE is performing communication with the network through the RN.

In association with control of the RN, the RN may be classified into an RN that is configured as a part of the donor cell or an RN that controls the cell by itself.

While the RN configured as a part of the donor cell may have an RN ID, the RN does not have its own cell identity. When at least a part of a Radio Resource Management (RRM) unit of the RN is controlled by the eNodeB to which the donor cell belongs (even when the remaining parts of the RRM are located at the RN), the RN is referred to as being configured as a part of the donor cell. Preferably, such an RN can support a legacy UE. Examples of such an RN include various types of relays such as smart repeaters, decode-and-forward relays, L2 (second layer) relays, and Type-2 relays.

On the other hand, the RN that controls the cell by itself controls one or more cells, unique physical layer cell identities are provided respectively to cells controlled by the RN, and the same RRM mechanism may be used for the cells. From the viewpoint of the UE, there is no difference between access to the cell controlled by the RN and access to the cell controlled by a general eNodeB. Preferably, the cell controlled by such an RN may support a legacy UE. Examples of such an RN include self-backhauling relays, L3 (third layer) relays, Type-1 relays, and Type-1a relays.

The Type-1 relay is an in-band relay that controls a plurality of cells, each of which appears to be an individual cell different from the donor cell from the viewpoint of the UE. In addition, each of the plurality of cells has a respective physical cell TD (which is defined in LTE Release-8) and the RN may transmit its synchronization channel, RSs, etc. In the case of a single-cell operation, the UE may directly receive scheduling information and HARQ feedback from the RN and transmit its own control channel (associated with Scheduling Request (SR), CQI, ACK/NACK, etc.) to the RN. In addition, the Type-1 relay appears as a legacy eNodeB (which operates according to the LTE Release-8 system) to a legacy UE (which operates according to the LTE Release-8 system). That is, the Type-1 relay has backward compatibility. The Type-1 relay appears as an eNodeB different from the legacy eNodeB to UEs which operates according to the LTE-A system, thereby providing performance improvement.

The Type-1a relay has the same characteristics as the above-described Type-1 relay except that Type-1a relay operates as an out-band relay. The Type-1a relay may be configured so as to minimize or eliminate an influence of the operation thereof on an L1 (first layer) operation.

The Type-2 relay is an in-band relay and does not have a separate physical cell ID. Thus, the Type-2 relay does not form a new cell. The Type-2 relay is transparent to the legacy UE such that the legacy UE cannot determine the presence of the Type-2 relay. Although the Type-2 relay can transmit a PDSCH, the Type-2 relay does not transmit at least a CRS and a PDCCH.

In order to enable the RN to operate as the in-band relay, some resources in the time-frequency space need to be reserved for the backhaul link and may be configured so as not to be used for the access link. This is referred to as resource partitioning.

The general principle of resource partitioning in the RN may be explained as follows. The backhaul downlink and the access downlink may be multiplexed in one carrier frequency using a Time Division Multiplexing (TDM) scheme (that is, only one of the backhaul downlink or the access downlink is activated in a specific time). Similarly, the backhaul uplink and the access uplink may be multiplexed in one carrier frequency using the TDM scheme (that is, only one of the backhaul uplink or the access uplink is activated in a specific time).

The multiplexing of the backhaul link using an FDD scheme may be described as a procedure in which backhaul downlink transmission is performed in a downlink frequency band and backhaul uplink transmission is performed in an uplink frequency band. The multiplexing of the backhaul link using a TDD scheme may be described as a procedure in which backhaul downlink transmission is performed in a downlink subframe of the eNodeB and the RN and backhaul uplink transmission is performed in an uplink subframe of the eNodeB and the RN.

For example, if backhaul downlink reception from the eNodeB and access downlink transmission to the UE are simultaneously performed in a predetermined frequency band when the RN is an in-band relay, a signal transmitted from the transmitter of the RN may be received by the receiver of the RN and thus signal interference or RF jamming may occur in the RF front end of the RN. Similarly, if access uplink reception from the UE and backhaul uplink transmission to the eNodeB are simultaneously performed in a predetermined frequency band, signal interference may occur in the RF front end of the RN. Accordingly, it is difficult to implement simultaneous transmission and reception in one frequency band at the RN unless the received signal and the transmitted signal are sufficiently separated (for example, unless the transmit antennas and the receive antennas are installed at sufficiently separated positions (for example, above or under the ground)).

Figure 10:
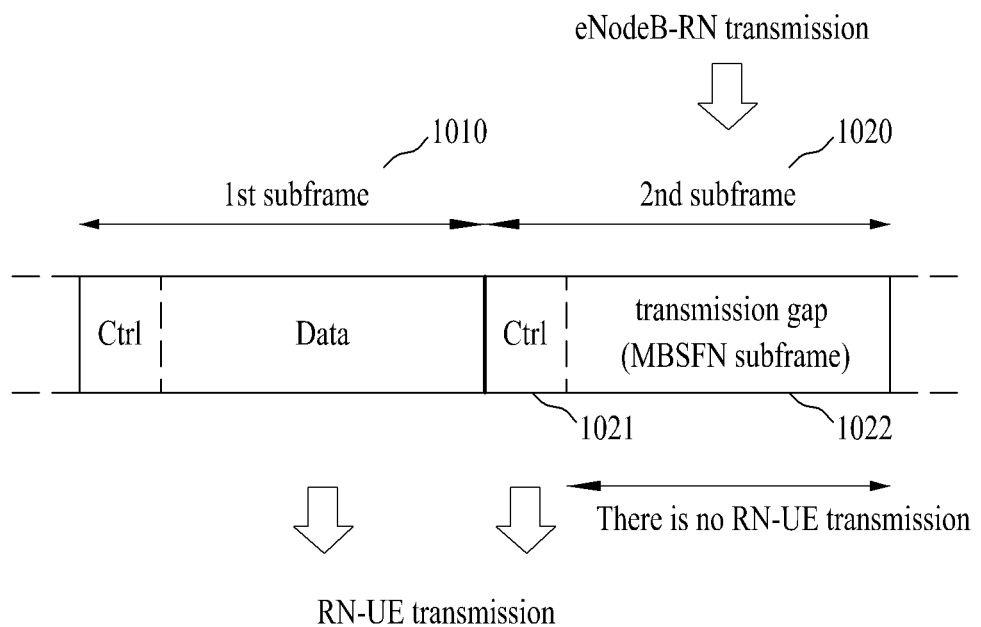
FIG. 10 illustrates an example of RN resource division.

In one method for solving such signal interference, the RN operates so as not to transmit a signal to the UE while a signal is being received from the donor cell. That is, a gap may be generated in transmission from the RN to the UE and may be set so as not to expect any transmission from the RN to the UE (including the legacy UE) during the gap. Such a gap may be set by configuring a Multicast Broadcast Single Frequency Network (MBSFN) subframe (see FIG. 10). In the example of FIG. 10, a first subframe 1010 is a general subframe in which a downlink (that is, access downlink) control signal and data is transmitted from the RN to the UE and a second subframe 1020 is an MBSFN subframe in which a control signal is transmitted from the RN to the UE in a control region 1021 of the downlink subframe while no signal is transmitted from the RN to the UE in the remaining region 1022 of the downlink subframe. Since the legacy UE expects transmission of the PDCCH in all downlink subframes (that is, since the RN needs to enable the legacy UEs within its own area to receive the PDCCH in every subframe so as to perform a measurement function), to enable correct operation of the legacy UEs, it is necessary to transmit the PDCCH in all downlink subframes. Accordingly, even in the subframe (the second subframe 1020)) set for transmission of the downlink (that is, the backhaul downlink) from the eNodeB to the RN, the RN needs to transmit the access downlink in first N (N=1, 2 or 3) OFDM symbol intervals of the subframe rather than receiving the backhaul downlink. Since the PDCCH is transmitted from the RN to the UE in the control region 1021 of the second subframe, it is possible to provide backward compatibility with the legacy UE served by the RN. While no signal is transmitted from the RN to the UE in the remaining region 1022 of the second subframe, the RN may receive a signal transmitted from the eNodeB in the remaining region 1022. Accordingly, the resource partitioning method may prevent the in-band RN from simultaneously performing access downlink transmission and backhaul downlink reception.

The second subframe 1022 using the MBSFN subframe is described below in detail. The control region 1021 of the second subframe may be considered an RN non-hearing interval. The RN non-hearing interval is an interval in which the RN does not receive a backhaul downlink signal and transmits an access downlink signal. This interval may be set to 1, 2 or 3 OFDM lengths as described above. The RN performs access downlink transmission to the UE in the RN non-hearing interval 1021 and performs backhaul downlink reception from the eNodeB in the remaining region 1022. Here, since the RN cannot simultaneously perform transmission and reception in the same frequency band, it takes a certain time to switch the RN from the transmission mode to the reception mode. Accordingly, it is necessary to set a guard time (GT) to allow the RN to switch from the transmission mode to the reception mode in a first portion of the backhaul downlink reception region 1022. Similarly, even when the RN operates to receive the backhaul downlink from the eNodeB and to transmit the access downlink to the UE, a guard time (GT) for switching the RN from the reception mode to the transmission mode may be set. The length of the guard time may be set to a time-domain value, for example, a value of k (k≥1) time samples Ts or a length of one or more OFDM symbols. Alternatively, in a predetermined subframe timing alignment relationship or in the case in which backhaul downlink subframes of the RN are consecutively set, the guard time of a last portion of the subframes may not be defined or set. Such a guard time may be defined only in a frequency region set for backhaul downlink subframe transmission in order to maintain backward compatibility (where it is not possible to support the legacy UE if the guard time is set in the access downlink interval). The RN can receive a PDCCH and a PDSCH from the eNodeB in the backhaul downlink reception interval 1022 excluding the guard time. The PDCCH and the PDSCH may be referred to as an R-PDCCH (Relay-PDCCH) and an R-PDCCH (Relay-PDCCH), respectively, to indicate that the PDCCH and the PDSCH are RN-dedicated physical channels.

Downlink Resource Allocation

Various downlink transmission resource allocation schemes may be defined.

Such downlink transmission resource allocation schemes may be referred to as resource allocation type 0, 1, and 2.

The resource allocation type 0 is a scheme in which a predetermined number of consecutive Physical Resource Blocks (PRBs) constitute a single Resource Block Group (RBG) and resources are allocated in units of RBGs. For example, all PRBs in an RBG which is designated as a downlink transmission resource may be allocated as downlink transmission resources. Accordingly, an RBG which is used for resource allocation can be easily represented in a bitmap manner in order to perform resource allocation. RBGs allocated to a certain UE (or RN) do not need to be adjacent to each other. When a plurality of RBGs which are not adjacent to each other is used for resource allocation, it is possible to achieve frequency diversity. The size of each RBG (P) may be determined according to the number of RBs $N_{RB}^{DL}$ allocated to downlink as shown in the following Table 1. FIG. 11(a) illustrates an example of downlink resource allocation according to the resource allocation type 0 in which the value of P is 4 and RBG 0, RBG 3, and RBG 4 are allocated to a specific UE.

TABLE 1

| Downlink Resource Blocks ($N_{RB}^{DL}$) | RBG size (P) |
|---|---|
| ≤10 | 1 |
| 11-26 | 2 |
| 27-63 | 3 |
| 64-110 | 4 |

The resource allocation type 1 is a scheme in which all RBGs are grouped into RBG subsets and PRBs in a selected RBG subset are allocated to a UE. Here, P RBG subsets are present and P corresponds to the size of an RBG. An RBG subset p (0≤p≤P) may include RBG p and every Pth RBGs when counted from the pth RBG. For example, as shown in FIG. 11(b), RBG subset 0 may include RBG 0, RBG 3, ..., RBG subset 1 may include RBG 1, RBG 4, ..., RBG subset 2 may include RBG 2, RBG 6, ..., and RBG subset 3 may include RBG 3, RBG 7, .... Accordingly, in the case of the resource allocation type 1, the resource allocation information may include 3 fields. The first field may indicate the selected RBG subset, the second field may indicate whether or not an offset is applied, and the third field may include a bitmap indicating PRBs in the selected RBG subset. Although the resource allocation type 1 can provide more highly flexible resource allocation and higher frequency diversity than the resource allocation type 0, the resource allocation type 1 requires higher control signal overhead. FIG. 11(b) illustrates an example of downlink resource allocation according to resource allocation type 1 in which the value of P is 4, and RBG subset 0 is selected for a specific UE.

The resource allocation type 2 is a scheme in which PRBs are not directly allocated but instead Virtual Resource Blocks (VRBs) are allocated and the VRBs are mapped to PRBs. One VRB has the same size as one PRB. 2 types of VRBs are present. One type is a localized-type VRB (LVRB) and the other is a distributed-type VRB (DVRB). For each VRB type, a pair of VRBs present over 2 slots in one subframe is allocated to one VRB number (nVRB). A localized-type VRB is directly mapped to a PRB such that nVRB=nPRB, where nPRB is PRB number. In the case of the distributed-type VRB, nVRB is mapped to nPRB according to a predetermined rule. Resource allocation information of the resource allocation type 2 indicates a set of localized-type VRBs or distributed-type VRBs which are consecutively allocated. The information may include a 1-bit flag indicating whether a localized-type VRB or a distributed-type VRB is allocated. In the case of the distributed-type VRB, VRB numbers may be interleaved through a block interleaver and may be mapped to PRB numbers. The first one of a pair of VRBs may be mapped to a PRB and the other may be mapped to a PRB which is separated from the PRB by a predetermined RB gap. Accordingly, an inter-slot hopping may be applied, thereby achieving frequency diversity.

Specifically, index numbers 0 to $N_{VRB}^{DL}-1$ are assigned to distributed-type VRBs. Consecutive $\tilde{N}_{VRB}^{DL}$ VRB numbers constitute one interleaving unit. Here, when one gap value is defined, $\tilde{N}_{VRB}^{DL}=N_{VRB}^{DL}$. VRB numbers are interleaved in corresponding interleaving units using a block interleaver. Here, the block interleaver has 4 columns and $N_{row}$ rows. Here, $N_{row}=\lceil \tilde{N}_{VRB}^{DL}/(4P) \rceil \cdot P$ and P is the size of an RBG defined as shown in Table 1. Here, an $\lceil x \rceil$ operation yields the minimum integer greater than x. VRB numbers are written (or input) row by row to such a configured block interleaver (i.e., VRB numbers are written to another row after being fully written to one row) and are then read out column by column from the block interleaver (i.e., VRB numbers are read from another column after being fully read from one column). Here, the block interleaver may not be fully filled with VRB numbers. In this case, $N_{null}$ null values are written to the $N_{null}/2$ th row of the 2nd and 4th columns of the block interleaver. Here. $N_{null}=4N_{row}-\tilde{N}_{VRB}^{DL}$. The null values are ignored when VRB numbers are read from the block interleaver. That is, VRB numbers, excluding the null values, are read from the block interleaver.

Figure 12:
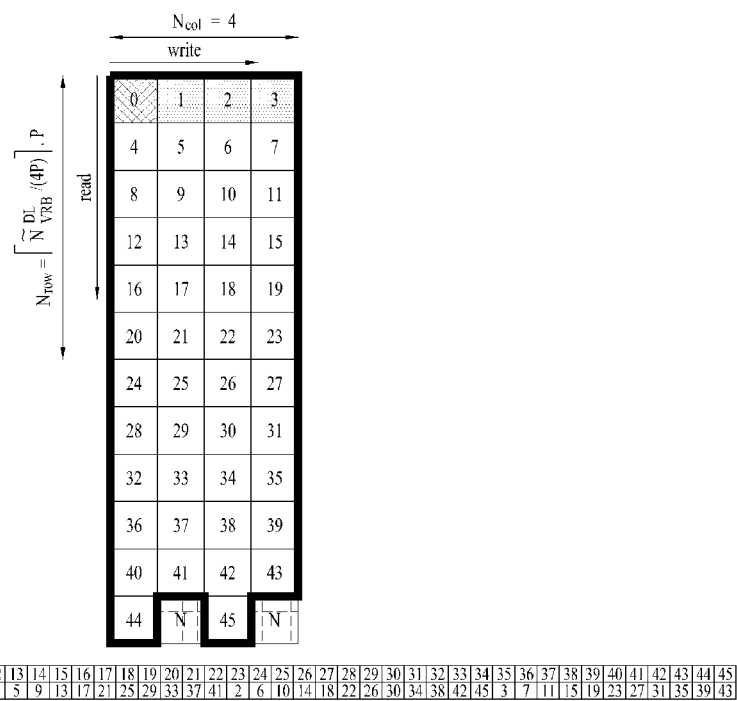
FIG. 12 illustrates a mapping relationship between VRB indices and PRB indices.

FIG. 12 schematically illustrate a mapping relationship between VRB indices and PRB indices using a block interleaver when $\tilde{N}_{VRB}^{DL}$ is 46.

A rule for mapping VRB numbers to PRB numbers can be mathematically represented by the following Expressions 15 to 17. Expression 15 is associated with even slot index $n_s$ (i.e., slot 0), Expression 16 is associated with odd slot index $n_s$ (i.e., slot 1), and Expression 17 is applied to all slot indices. In Expression 15, $n_{VRB}$ can be acquired from downlink scheduling allocation information.

$$\tilde{n}_{PRB}(n_s) = \qquad \text{Expression 15}$$

$$\begin{cases} \tilde{n}'_{PRB}-N_{row}, & \tilde{n}_{VRB} \geq \tilde{N}_{VRB}^{DL}-N_{null} \text{ and} \\ & \tilde{n}_{VRB}\bmod 2 = 1 \\ \tilde{n}'_{PRB}-N_{row}+ & N_{null} \neq 0 \text{ and} \\ N_{null}/2, & \tilde{n}_{VRB} \geq \tilde{N}_{VRB}^{DL}-N_{null} \text{ and} \\ & \tilde{n}_{VRB}\bmod 2 = 0 \\ \tilde{n}''_{PRB}-N_{null}/2, & \tilde{n}_{VRB} < \tilde{N}_{VRB}^{DL}-N_{null} \text{ and} \\ & \tilde{n}_{VRB}\bmod 4 \geq 2 \\ \tilde{n}''_{PRB}, & \text{otherwise} \end{cases}, \text{where}$$

$$\tilde{n}'_{PRB} = 2N_{row} \cdot (\tilde{n}_{VRB}\bmod 2) + \lfloor \tilde{n}_{VRB}/2 \rfloor + \tilde{N}_{VRB}^{DL} \cdot \lfloor \tilde{n}_{VRB}/\tilde{N}_{VRB}^{DL} \rfloor, \text{ and}$$

$$\tilde{n}''_{PRB} = N_{row} \cdot (\tilde{n}_{VRB}\bmod 4) + \lfloor \tilde{n}_{VRB}/4 \rfloor + \tilde{N}_{VRB}^{DL} \cdot \lfloor n_{VRB}/\tilde{N}_{VRB}^{DL} \rfloor, \text{ where}$$

$$\tilde{n}_{VRB} = n_{VRB}\bmod \tilde{N}_{VRB}^{DL}$$

$$\tilde{n}_{PRB}(n_s) = \qquad \text{Expression 16}$$
$$(\tilde{n}_{PRB}(n_s-1) + \tilde{N}_{VRB}^{DL}/2)\bmod \tilde{N}_{VRB}^{DL} + \tilde{N}_{VRB}^{DL} \cdot \lfloor n_{VRB}/\tilde{N}_{VRB}^{DL} \rfloor$$

$$n_{PRB}(n_s) = \qquad \text{Expression 17}$$

$$\begin{cases} \tilde{n}_{PRB}(n_s), & \tilde{n}_{PRB}(n_s) < \tilde{N}_{VRB}^{DL}/2 \\ \tilde{n}_{PRB}(n_s)+N_{gap}-\tilde{N}_{VRB}^{DL}/2, & \tilde{n}_{PRB}(n_s) \geq \tilde{N}_{VRB}^{DL}/2 \end{cases}$$

For details of the mapping relationship between VRBs and PRBs, refer to the description of the standard document (specifically, section 6.2.3 of 3GPP LTE TS36.211).

Downlink Control Information Through R-PDCCH

First, a description is given of the case in which a backhaul downlink subframe and a backhaul uplink subframe are allocated in a pair. When the eNodeB allocates a backhaul downlink subframe for signal transmission to the RN, the RN may feed an ACK/NACK signal indicating success or failure of reception (or decoding) of data transmitted in the allocated downlink subframe back to the eNodeB through a backhaul uplink subframe. The timing of the backhaul uplink subframe in which the RN feeds the uplink ACK/NACK signal to the eNodeB may be set to a predetermined time after the timing of the backhaul downlink subframe in which the RN receives data. For example, when the RN receives downlink data from the eNodeB in downlink subframe #n, the RN may transmit an uplink ACK/NACK signal in uplink subframe #(n+k). In addition, the RN may receive an uplink grant signal from the eNodeB through an R-PDCCH in a backhaul downlink subframe and may transmit uplink data to the eNodeB through a backhaul uplink subframe based on the received uplink grant signal. The timing of the backhaul uplink subframe in which the RN transmits uplink data to the eNodeB may be set to a predetermined time after the timing of the backhaul downlink subframe in which the RN receives the uplink grant signal. For example, when the RN receives an uplink grant from the eNodeB in downlink subframe #n, the RN may transmit uplink data in uplink subframe #(n+k). In this manner, one backhaul downlink subframe (for example, downlink subframe #n) may be paired with a backhaul uplink subframe of a predetermined time later (for example, uplink subframe #n+k) for uplink ACK/NACK transmission and uplink data transmission of the RN. That is, a downlink subframe and an uplink subframe which are at a predetermined subframe interval k may be paired. For example, in the case of a 3GPP LTE FDD system, it is preferable that the value of k be fixed to 4 since the interval between downlink data reception and uplink ACK/NACK transmission and the interval between uplink grant reception and uplink data transmission are all set to 4 subframes.

As described above, when backhaul downlink and uplink subframes are allocated in a pair, uplink ACK/NACK transmission and uplink data transmission may be simultaneously performed in one backhaul uplink subframe. To accomplish this, the present invention suggests that the eNodeB sets uplink grant information to be transmitted together with downlink allocation information in a subframe which carries the downlink allocation information. Thus, through uplink grant information that is transmitted in the same downlink subframe as that in which downlink allocation information for downlink data transmission is transmitted, a part of the resources of an uplink subframe (for example, subframe #n+k) which is paired with a backhaul downlink subframe (for example, subframe #n) in which downlink data is transmitted can be allocated to the RN each time the downlink data is transmitted. Accordingly, the RN can transmit uplink ACK/NACK information of downlink data using the part of the resources of the uplink subframe allocated to the RN. Here, when the RN transmits uplink data based on an uplink grant received from the eNodeB, uplink ACK/NACK information may be transmitted by sharing the same resources with uplink data. To accomplish this, it is possible to apply a method in which uplink control information defined in the conventional 3GPP LTE system is piggybacked on the resources of an uplink data channel (PUSCH).

It is also possible to perform setting such that downlink allocation information and uplink grant information are transmitted in the same downlink subframe to allow Uplink Control Information (UCI) such as a Channel Quality Information (CQI) report and a Scheduling Request (SR), as well as the UL ACK/NACK described above, to be transmitted in uplink resources allocated by an uplink grant.

In addition, even when the RN has no uplink data to be transmitted to the eNodeB, it is possible to perform setting such that downlink allocation information and uplink grant information are transmitted in the same downlink subframe. In this case, since the eNodeB always transmits an uplink grant to the RN even when the RN has no uplink data, the RN can secure resources for transmitting an uplink ACK/NACK, a CQI, and/or an SR.

When downlink allocation information and uplink grant information have been set to be transmitted in the same downlink subframe as described above, there is no need to separately design an uplink channel for uplink control information and an uplink channel for uplink data transmission and therefore it is possible to simplify uplink channel design and to enable more efficient resource utilization.

Figure 13:
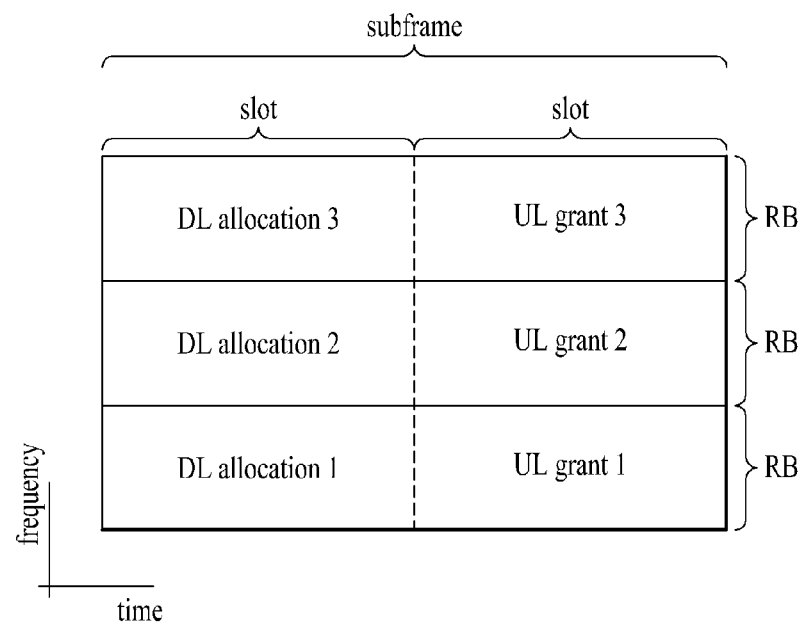
FIG. 13 illustrates an example in which a downlink allocation and an uplink grant are transmitted in a single backhaul downlink subframe.

FIG. 13 illustrates an example in which a downlink allocation (DL assignment) and an uplink grant (UL grant) are transmitted in one backhaul downlink subframe. Since the RN can decode downlink data only after the RN receives downlink allocation information, it is preferable that the downlink allocation information be transmitted earlier than uplink grant information in order to secure as much of the downlink data decoding time as possible. For example, the downlink allocation information may be set to be transmitted in an OFDM symbol prior to that of uplink grant information. The downlink allocation information may be set to be transmitted in a first slot while the uplink grant information may be set to be transmitted in a second slot.

When an R-PDCCH is transmitted, it is possible to consider two R-PDCCH transmission schemes according to whether or not one R-PDCCH is interleaved with another R-PDCCH.

First, when one R-PDCCH is not interleaved with another R-PDCCH, one slot in an RB is used to transmit only one R-PDCCH. Accordingly, the present invention suggests that uplink grant information for the RN associated with downlink allocation information (i.e., the RN which is to receive downlink data according to the downlink allocation information) be transmitted in the second slot of an RB in which the downlink allocation information is transmitted. Thus, it is possible to reduce the number of times the RN performs blind decoding.

Blind decoding is a process for attempting to perform PDCCH decoding according to each of the hypotheses which have been set associated with various formats (for example, a PDCCH DCI format) of downlink control information (downlink allocation or a scheduling signaling such as an uplink grant). That is, the scheduling signaling may have various predetermined formats, the format of scheduling signaling to be transmitted to the UE is not previously signaled to the UE, and the UE is set to perform PDCCH decoding. For example, when the UE has succeeded in PDCCH decoding according to one hypothesis, the UE can perform uplink/downlink transmission according to the scheduling signaling. However, when the UE has not succeeded in PDCCH decoding, the UE may attempt to perform decoding according to another hypothesis associated with the format of the scheduling signaling. Accordingly, blind decoding load and complexity increase as the number of formats that the scheduling signaling may have increases. In addition, as the number of candidate RB positions at which the scheduling signaling can be transmitted increases, blind decoding complexity increases since it is necessary to perform blind decoding for all RBs.

Accordingly, in the case in which uplink grant information of an RN is set to be transmitted in the second slot of an RB in which downlink allocation information of the RN is transmitted, it is possible to reduce blind decoding complexity. Specifically, when an RN has detected downlink allocation information of the RN in an RB, the RN can assume that uplink grant information of the RN is always transmitted in the second slot of the RB. Accordingly, the RN does not need to perform blind decoding for detecting uplink grant information in a number of RBs and may perform blind decoding only in the RB in which the downlink allocation information has been detected, thereby simplifying RN operation implementation.

Next, the RN may operate in the following manner when downlink allocation information is transmitted over a number of RBs.

First, the RN may perform blind decoding assuming that uplink grant information is transmitted in second slots of all RBs in which downlink allocation information has been detected.

The RN may also perform blind decoding assuming that uplink grant information having a specific size is transmitted at specific positions in RBs in which downlink allocation information has been detected. For example, it is possible to assume that an uplink grant is transmitted in second slots of only some of the RBs which are occupied by downlink allocation information (for example, only the half of RBs with the lower indices among the RBs which are occupied by downlink allocation information). In this case, downlink data of the RN may be transmitted in the second slots of the remaining RBs.

The RN may also perform blind decoding assuming that an uplink grant, which may have various sizes and various positions, is transmitted in second slots of RBs in which downlink allocation information has been detected.

Although the above description has been given assuming that an R-PDCCH has not been interleaved, downlink allocation information and uplink grant information may be transmitted as described above even when interleaving is applied.

Figure 14:
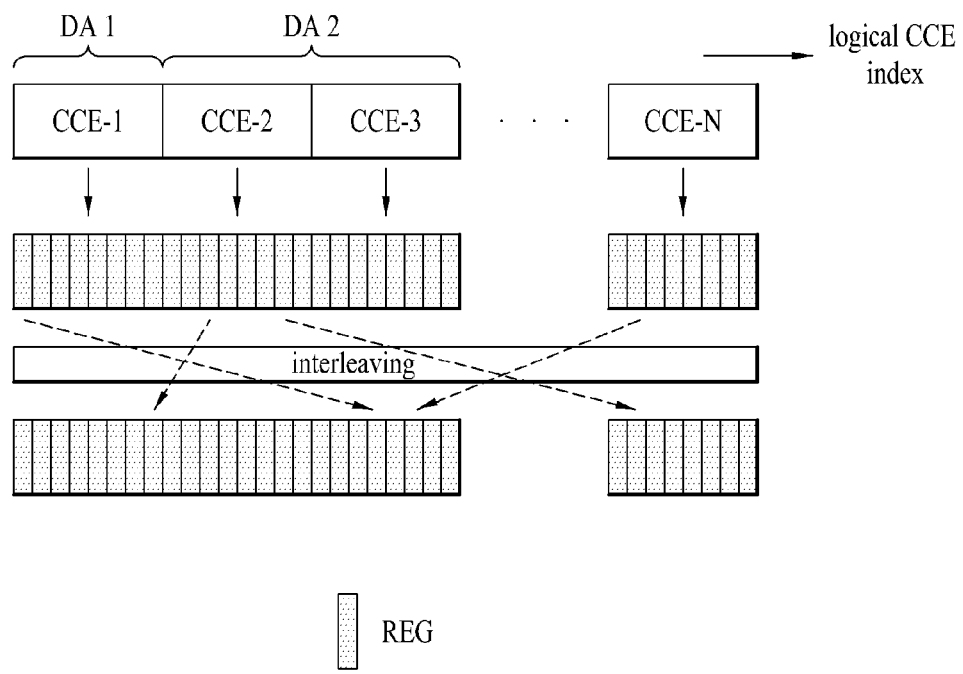
FIG. 14 illustrates an example in which interleaving is applied to an R-PDCCH.

FIG. 14 illustrates an example in which interleaving is applied to an R-PDCCH.

First, an R-PDCCH is transmitted through an aggregation of one or more consecutive CCEs, each of which corresponds to a plurality of Resource Element Groups (REGs). The CCE aggregation level is a CCE unit for R-PDCCH search and is defined as the number of adjacent CCEs. In the example of FIG. 14, one CCE corresponds to 8 REGs, the CCE aggregation level of a downlink allocation DA1 of a first RN is 1, and the CCE aggregation level of a downlink allocation DA2 of a second RN is 2.

As shown in FIG. 14, the downlink allocation DA may be interleaved in units of REGs. Specifically, one DA may include one or more CCEs, each of which may be fragmented into a specific number of REGs, and may be interleaved with another DA in units of REGs. As a result of REG-based interleaving, REGs which have different positions from the original positions may be sequentially mapped to a downlink allocation (DL assignment) search space.

In addition, the present invention suggests a method in which, when REG-based interleaving is applied to a downlink allocation (DA), the DA and a UL grant (UG) are transmitted in the same subframe and the same interleaving structure is applied to the DA and the UG.

Figure 15:
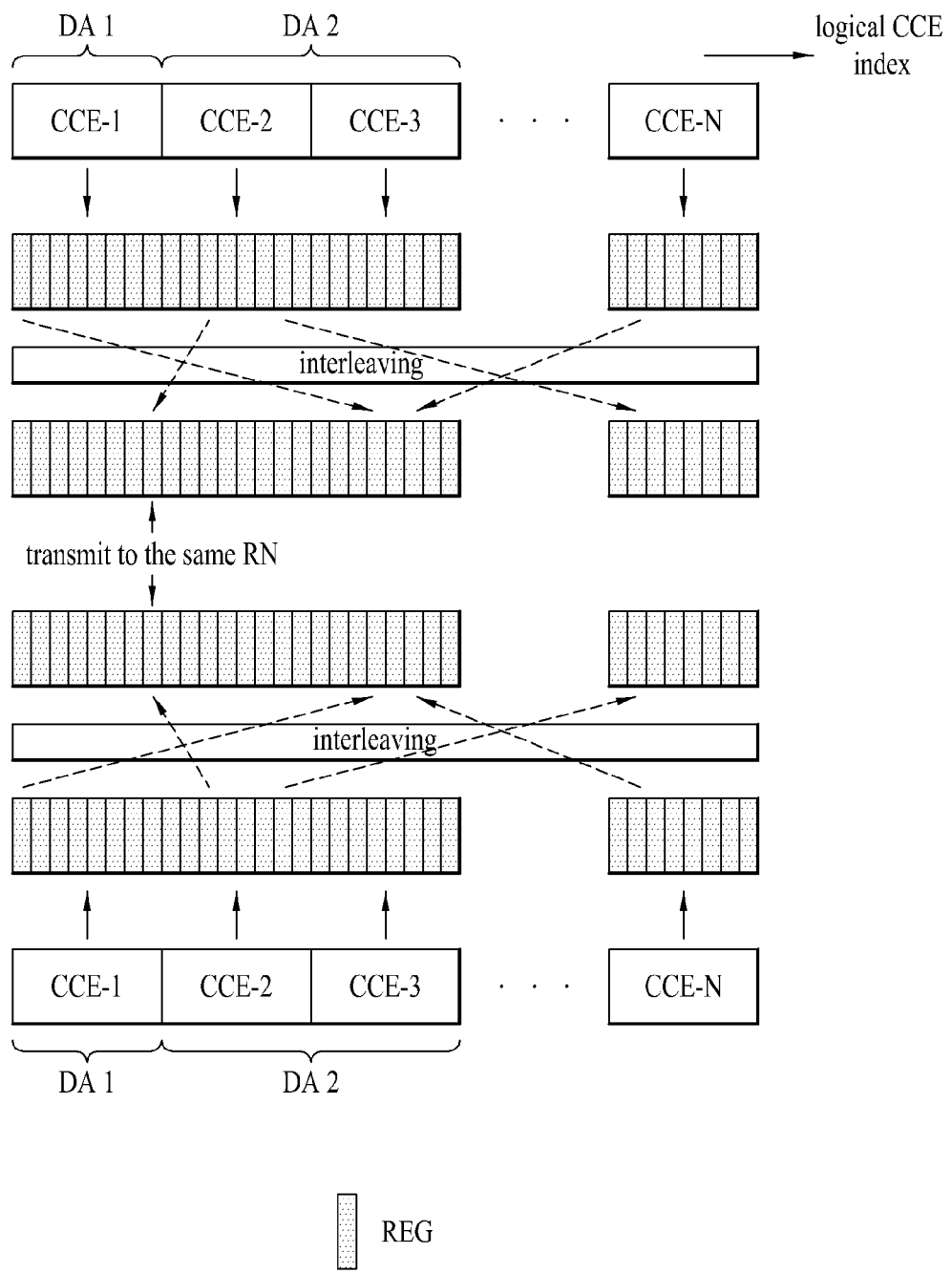
FIG. 15 illustrates an example in which interleaving having the same structure is applied to a downlink allocation and an uplink grant.

As suggested in the present invention, each RN receives one DA and one UG in a subframe. FIG. 15 illustrates an example in which interleaving having the same structure is applied to a DA and a UG.

First, the CCE aggregation levels of the DA and the UG may be equalized for each RN. That is, the number of CCEs that constitute a UG of one RN may be set equal to the number of CCEs that constitute a DA of the RN. For example, as shown in FIG. 15, a UG (UG1) for the first RN may be set to be constructed of one CCE when a DA (DA1) for the first RN is constructed of one CCE and a UG (UG2) for the second RN may be set to be constructed of one CCE when a DA (DA2) for the second RN is constructed of one CCE.

Then, the order in which CCEs are arranged may be set to be equal for DAs and UGs. For example, as shown in FIG. 15, when CCEs for DAs are arranged in the order of CCE-1 corresponding to DA1 and CCE-2 and CCE-3 corresponding to DA2, CCEs for UGs may be set to be arranged in the order of CCE-1 corresponding to UG1 and CCE-2 and CCE-3 corresponding to UG2, i.e., in the same order as that of CCEs for DAs.

Finally, interleaving having the same structure may be applied to a DA and a UG. For example, as shown in FIG. 15, the rule applied to REG-based interleaving for DAs may be equally applied to REG-based interleaving for UGs.

When the interleaving structure described above is applied to DAs and UGs, REGs of a DA and a UG having the same interleaved REG indices may be transmitted to the same RN.

Accordingly, even when interleaving is applied to an R-PDCCH, an RN may assume, upon detecting a DA, that a UG having the same CCE aggregation level and the same logical CCE indices as the detected DA has been transmitted to the RN. Therefore, the RN which has detected the DA does not need to perform blind decoding on a UG over a number of positions. Accordingly, it is possible to reduce R-PDCCH blind decoding complexity of the RN.

As described above, in the case in which a downlink allocation and an uplink grant are simultaneously transmitted in one subframe, the eNodeB may notify the RN of information regarding resources, through which the RN is to transmit uplink control information (for example, an uplink ACK/NACK), through downlink allocation information or uplink grant information.

For example, information (for example, a subframe index, an offset value, a HARQ process identifier, or the like) regarding the time to transmit uplink ACK/NACK information of currently transmitted downlink data may be included in a downlink allocation or an uplink grant to be transmitted to the RN. Alternatively, information (for example, RB allocation information, a PUCCH resource index, or the like) regarding the position of a resource for transmitting uplink ACK/NACK information of currently transmitted downlink data may be included in a downlink allocation or an uplink grant to be transmitted to the RN.

The operations described above may also be applied when downlink subframes and uplink subframes are not allocated in pairs (for example, when the number of downlink subframes is greater than the number of uplink subframes. That is, the eNodeB may operate so as to transmit a downlink allocation and an uplink grant together in one subframe regardless of whether or not downlink subframes and uplink subframes are allocated in pairs.

When downlink subframes and uplink subframes are not allocated in pairs, only a downlink allocation may be transmitted in one subframe and the RN may implicitly determine information regarding the time and/or resource for transmitting uplink ACK/NACK information of downlink data according to a predetermined rule. In one example of the rule, uplink ACK/NACK information may be transmitted in an uplink subframe (for example, subframe #(n+4+a)) that is first present after 4 subframes from a subframe (for example, subframe #4) in which downlink data has been received. In addition, a resource used to transmit uplink ACK/NACK information in subframe #(n+4+a) may be determined in the following manner. For example, when another uplink ACK/NACK (AN2) is transmitted in the same uplink subframe as the subframe #(n+4+a) in which one uplink ACK/NACK (AN1) is to be transmitted, downlink data associated with the AN2 (for example, downlink received in subframe #(n+a) may be present. Here, a resource (i.e., a resource for transmitting AN2), which is explicitly specified through a downlink allocation for downlink data associated with AN2 or through an uplink grant transmitted together with the downlink allocation, may be set to be used to transmit AN1 together with AN2.

As described above, the present invention provides a method in which a downlink allocation and an uplink grant for one RN are set to be transmitted in the same single downlink subframe such that it is possible to simplify uplink channel design and blind decoding load both when interleaving is applied to an R-PDCCH and when interleaving is applied to an R-PDCCH.

In addition, although the present invention has been described mainly with reference to an R-PDCCH as an example, the scope of the present invention is not limited to the R-PDCCH. For example, the same principles as suggested by the present invention can be applied and the same advantages can be achieved when a control channel such as an advanced PDCCH, which carries downlink control information (DCI) for a UE, can be located at a first slot and/or a second slot of one subframe.

R-PDCCH Search Space Setting

R-PDCCHs that are transmitted from an eNodeB to one RN may be classified into interleaved R-PDCCHs characterized in that each R-PDCCH is fragmented into REGs (each including 4 REs) and REGs of the R-PDCCH are mixed with REGs of other R-PDCCH(s) and non-interleaved R-PDCCHs characterized in that an R-PDCCH transmits for only one RN is present in one physical resource block (PRB). The following is a description of examples of how a search space for blind decoding of a non-interleaved R-PDCCH is determined according to present invention.

First, the present invention suggests that only one R-PDCCH be transmitted in one resource block group (RBG). Accordingly, it is possible to avoid the case in which it is unclear to which RN a corresponding resource is allocated since R-PDCCHs for a plurality of RNs cannot be present in an RBG including one or more RBs (i.e., an RBG which is a basic resource allocation unit in the resource allocation type 0).

Figure 16:
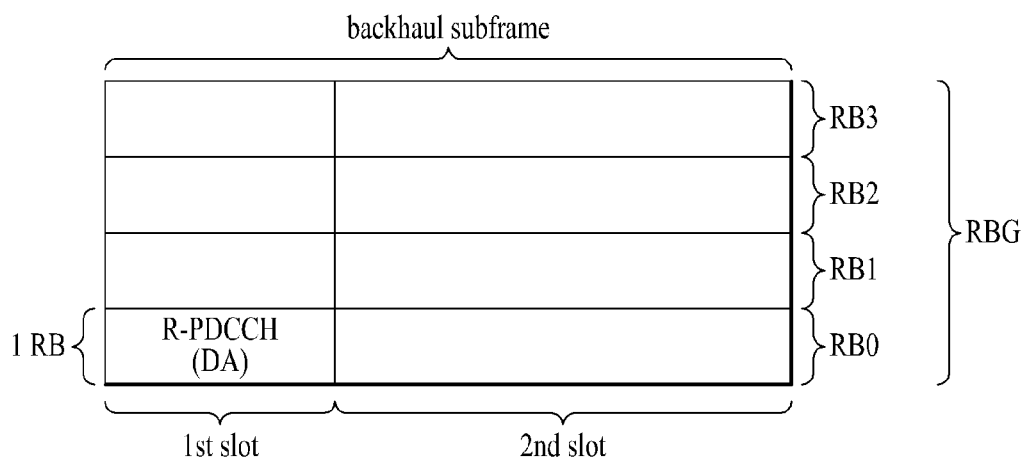
FIG. 16 illustrates an example in which one R-PDCCH is transmitted using one RB when one RBG includes 4 RBs.

FIG. 16 illustrates an example in which one R-PDCCH is transmitted using one RB when one RBG includes 4 RBs. The R-PDCCH of FIG. 16, which is a channel for downlink allocation (DA), may be set such that the R-PDCCH associated with downlink information is transmitted only in the first slot in order to reduce decoding latency and to quickly decode downlink data. The first slot is shown as being shorter than the second slot in FIG. 16 since FIG. 16 shows a backhaul downlink subframe for the RN excluding a section in which a PDCCH is transmitted from the RN to a UE at a front part (see "1021" of FIG. 10) of the first slot.

Although the present invention is described below with reference to the case in which an R-PDCCH associated with downlink allocation information is transmitted in the first slot of a backhaul downlink subframe as an example for clear explanation of the present invention, the present invention is not limited to the case. That is, the same principle as described with reference to an R-PDCCH carrying downlink allocation information according to the present invention may also be applied to the case in which an R-PDCCH carrying downlink allocation information is transmitted in the second slot of a backhaul downlink subframe.

According to an example of the present invention, the eNodeB may notify the RN of the position of a search space for each aggregation level through a higher layer signal. Here, the aggregation level may indicate the size of a resource occupied by one R-PDCCH. In the case in which a downlink allocation (DA) is transmitted in the first slot of a downlink subframe, the aggregation level n indicates that one R-PDCCH is transmitted using the first slots of n RBs. That is, the example of FIG. 16 corresponds to the case in which the aggregation level is 1.

Figure 17:
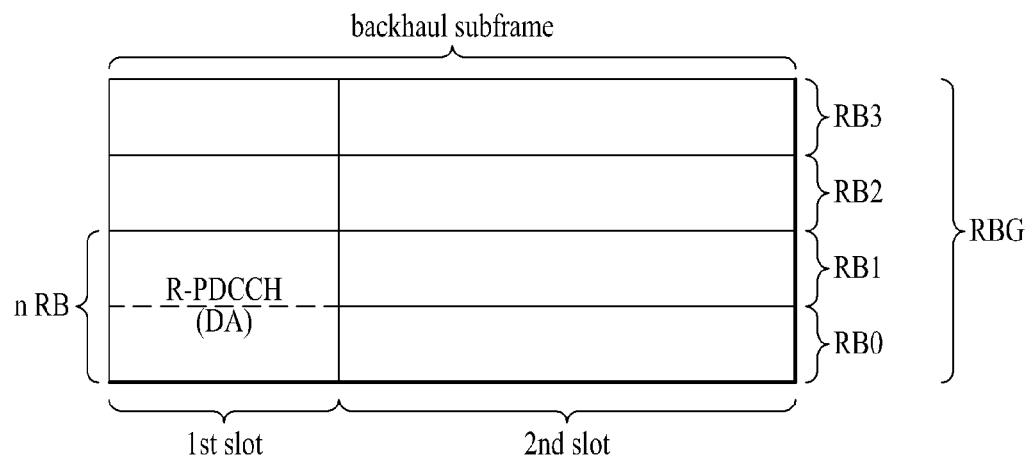
FIG. 17 illustrates an example in which the aggregation level is n such that one R-PDCCH is transmitted using a plurality of RBs (n RBs)

FIG. 17 illustrates an example in which the aggregation level is n such that one R-PDCCH is transmitted using a plurality of RBs (n RBs). As described above, when only one R-PDCCH is set to be transmitted in one RBG, the position of a search space of the R-PDCCH may be expressed as the position of the RBG. That is, when a specific RBG is specified as a search space of a R-PDCCH of a specific aggregation level, this indicates that the RN performs blind decoding on an R-PDCCH for a number of RBs (i.e., n RBs) corresponding to the aggregation level with reference to a specified position in the RBG. Here, the specified position in the RBG may be a position corresponding to the lowest RB index, the highest RB index, or a specific offset value. The specific offset value may be explicitly given by a higher layer signal or may be set to a value that is implicitly given (or derived) by a cell ID. In one method of determining a number of RBs (n RBs) corresponding to the aggregation level with reference to the specified position in the RBG, the same number of RBs (n RBs) as the aggregation level may be selected in increasing order of RB index or in decreasing order of RB index starting from the specified position in the RBG and the selected RBs may then be determined as a search space of an R-PDCCH. Here, if the boundary of the RBG is exceeded when n RBs are selected in increasing order of RB index and in decreasing order of RB index starting from the specific position, another RB of the RBG may be selected in a circular shift manner and then be determined to be included in the n RBs.

For example, the eNodeB may notify a specific RN of a set of search spaces set corresponding to aggregation levels 1, 2, and 4. Signaling that the eNodeB uses to notify the RN of the search space set may be configured in the form of a bitmap of all RBGs. Here, a search space set may be set such that there is a specific correlation between each aggregation level and the number of RBGs belonging to a search space set for the aggregation level. For example, when N RBGs are allocated to a search space of aggregation level 1, N/2 RBGs may be allocated to a search space of aggregation level 2 and N/4 RBGs may be allocated to a search space of aggregation level 4. In the case in which such a correlation is set, the blind decoding scheme may have a structure similar to a blind decoding scheme for each aggregation level of a PDCCH that is transmitted from an eNodeB to a UE in the conventional 3GPP LTE system.

In another example, search space sets may be set such that there is a specific inclusion relationship between respective search space sets of aggregation levels. For example, an RBG set allocated to a search space of a higher aggregation level may include a subset of an RBG set allocated to a search space of a lower aggregation level. For example, some of RBGs belonging to a search space set of aggregation level 1 may constitute a search space set of aggregation level 2 and some of RBGs belonging to a search space set of aggregation level 2 may constitute a search space set of aggregation level 4. When search space sets are set so as to have such an inclusion relationship, it is possible to reduce the overhead of signaling for allocating a search space set for each aggregation level.

For example, when N RBGs are allocated to a search space of aggregation level 1, half number of the RBGs (i.e., N/2 RBGs) (for example, odd or even RBGs) among the N RBGs may constitute a search space set of aggregation level 2. Here, a 1-bit indicator may be used to notify the RN of which RBG set is to be used as a search space from among 2 RBG sets (for example, odd or even RBGs) which may be constructed of N RBGs. The eNodeB may transmit such a 1-bit indicator as a higher layer signal. In addition, a half number of RBGs (i.e., N/4 RBGs) (for example, odd or even RBGs) among N/2 RBGs allocated to a search space of aggregation level 4 may constitute a search space set of aggregation level 4. Here, a 1-bit indicator may be used to notify the RN of which RBG set is to be used as a search space from among 2 RBG sets (for example, odd or even RBGs) which may be constructed of N/2 RBGs.

FIG. 18 illustrates an example in which an RBG set allocated to a search space of a higher aggregation level is constructed of a subset of an RBG set allocated to a search space of a lower aggregation level. In the example of FIG. 18(*a*), it is assumed that an eNodeB allocates all RBGs of a system bandwidth to a search space of aggregation level 1. Then, the eNodeB may notify the RN of allocation information of the search space of aggregation level using a 1-bit indicator. As shown in FIG. 18(*b*), when the value of this indicator is 0, odd RBGs (1st, 3rd, 5th, 7th, . . . ) RBGs among RBGs that constitute the search space of aggregation level 1 are allocated to the search space of aggregation level 2 and, when the value of this indicator is 1, even RBGs (2nd, 4th, 6th, 8th, . . . ) RBGs among RBGs that constitute the search space of aggregation level 1 are allocated to the search space of aggregation level 2. FIG. 18(*c*) shows RBGs that are allocated to the search space of aggregation level 4 when an indicator for the search space of aggregation level 2 is 0 and FIG. 18(*d*) shows RBGs that are allocated to the search space of aggregation level 4 when the indicator for the search space of aggregation level 2 is 1. The eNodeB may notify the RN of a 1-bit indicator for the search space of aggregation level 4 in addition to the 1-bit indicator for the search space of aggregation level 2. When the value of the 1-bit indicator for the search space of aggregation level 4 is 0, odd RBGs (1st, 3rd, 5th, 7th, . . . ) RBGs among RBGs that constitute the search space of aggregation level 2 are allocated to the search space of aggregation level 4 and, when the value of this 1-bit indicator is 1, even RBGs (2nd, 4th, 6th, 8th, . . . ) RBGs among RBGs that constitute the search space of aggregation level 2 are allocated to the search space of aggregation level 4.

In the search space allocation operation described above, search spaces may be fixedly set such that all RBGs in the system bandwidth are allocated to the search space of aggregation level 1. In addition, search spaces may be fixedly set such that all even RBGs among all RBGs of the system bandwidth are allocated to the search space of aggregation level 2 and every $4^{th}$ RBGs among all RBGs of the system bandwidth are allocated to the search space of aggregation level 4. When search spaces are fixedly set in this manner, each of the indicators of allocation information of the search spaces of aggregation level 2 and aggregation level 4 is fixed to a specific value as described above with reference to FIG. 18 and therefore it is possible to reduce signaling overhead since there is no need to provide the indicators. FIG. 19 illustrates RBGs that are allocated to the search spaces of aggregation levels 1, 2, and 4 in the above manner.

A frequency localized R-PDCCH transmission scheme or a frequency distributed R-PDCCH transmission scheme may be applied when an R-PDCCH search space is designed. The frequency localized scheme is a method in which an R-PDCCH is transmitted using adjacent resources in a frequency region (i.e., using RBs belonging to the same RBG as shown in FIG. 17) when the aggregation level is 2 or higher. On the other hand, the frequency distributed scheme is a method in which an R-PDCCH is transmitted using resources which are spaced from each other in a frequency region in order to achieve a frequency diversity gain when the aggregation level is 2 or higher. The following is a more detailed description of a method of designing search spaces according to a frequency distributed scheme.

In the frequency distributed R-PDCCH transmission scheme, the search space for aggregation level 1 may be configured in the same manner as in the frequency localized R-PDCCH transmission scheme. That is, an R-PDCCH of aggregation level 1 may be transmitted using one RB at a specified position per RBG and a bitmap-format signaling indicating which RBG has been allocated to the search space of aggregation level 1 may be transmitted from the eNodeB to the RN. The search space of aggregation level 1 may also be fixedly set such that all RBGs of the system bandwidth are allocated to the search space of aggregation level 1 without providing such a signaling.

Figure 20:
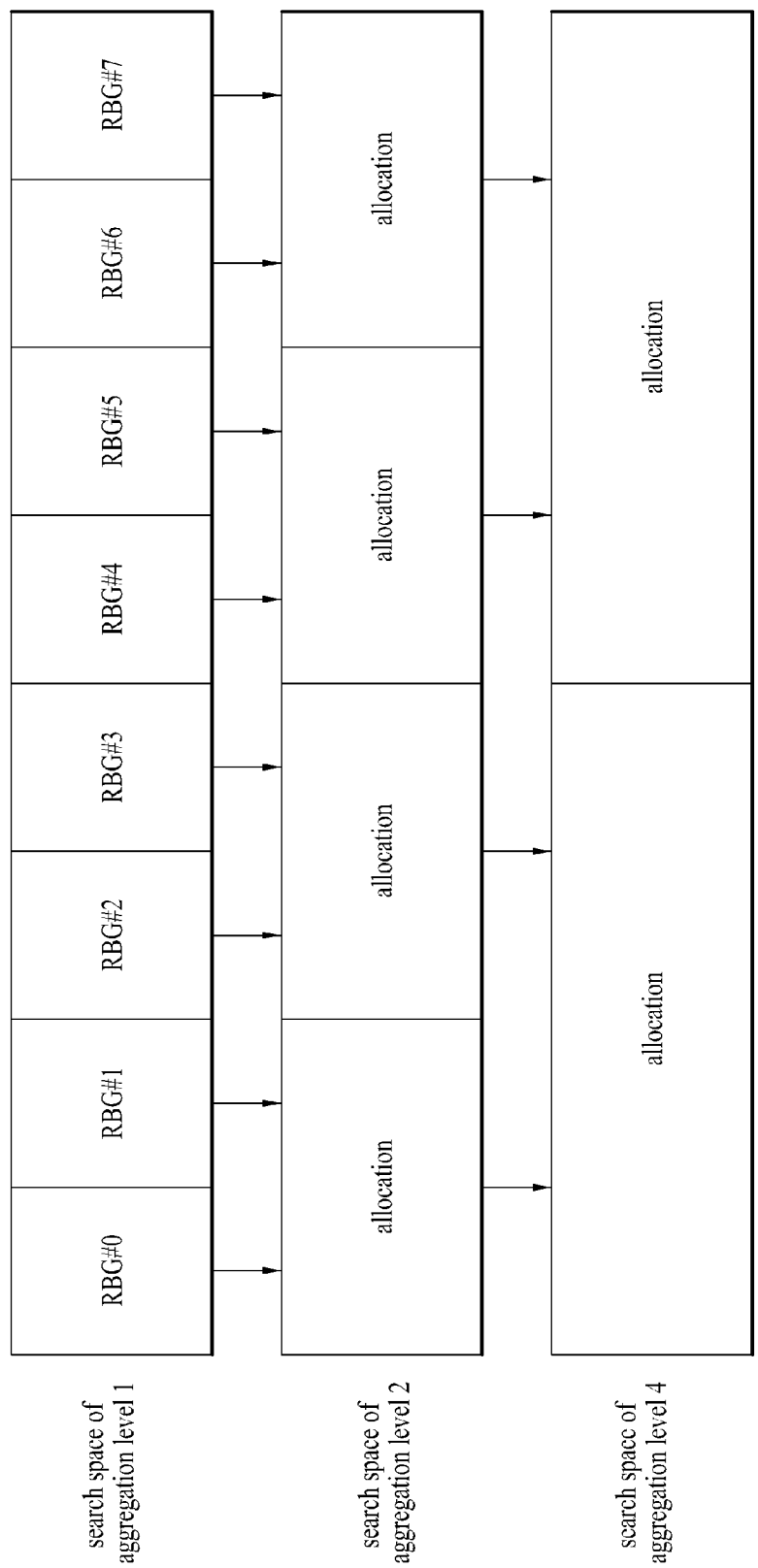
FIGS. 20 and 21 illustrate a method for configuring an R-PDCCH search space according to the present invention.

In the frequency distributed R-PDCCH transmission scheme, 2 RBGs allocated to the search space of aggregation level 1 described above may be grouped to constitute a search space of aggregation level 2 unlike in the frequency localized R-PDCCH transmission scheme. FIG. 20 illustrates a scheme in which 2 adjacent RBGs among RBGs of a lower aggregation level are grouped to constitute a search space of a higher aggregation level.

For example, indices may be newly assigned only to RBGs allocated to the search space of aggregation level 1 and two adjacent RBGs may be grouped based on the newly assigned indices and may be allocated to the search space of aggregation level 2. Here, the expression "newly assigning indices to RBGs" indicates that indices are sequentially assigned only to RBGs allocated to the search space of aggregation level 1 according to a predetermined scheme, rather than using all RBG indices of the system bandwidth since the RBGs allocated to the search space of aggregation level 1 may be part of the RBGs of the system bandwidth.

Similarly, indices may be newly assigned only to RBGs allocated to the search space of aggregation level 2 and two adjacent RBGs may be grouped based on the newly assigned indices and may be allocated to the search space of aggregation level 4. In other words, new indices may be assigned to only RBGs allocated to aggregation level 1 and 4 adjacent RBGs may be grouped based on the new indices and may be allocated to the search space of aggregation level 4.

When indices are sequentially assigned only to RBGs allocated to the search space of aggregation level 1 according to a predetermined scheme, indices may be assigned in the same order as the order of Virtual Resource Block (VRB) indices or Physical Resource Block (PRB) indices given by downlink allocation information (see the example of FIG. 20). However, a method of reordering RBG indices may be additionally applied in order to maximize frequency diversity gain.

Figure 21:
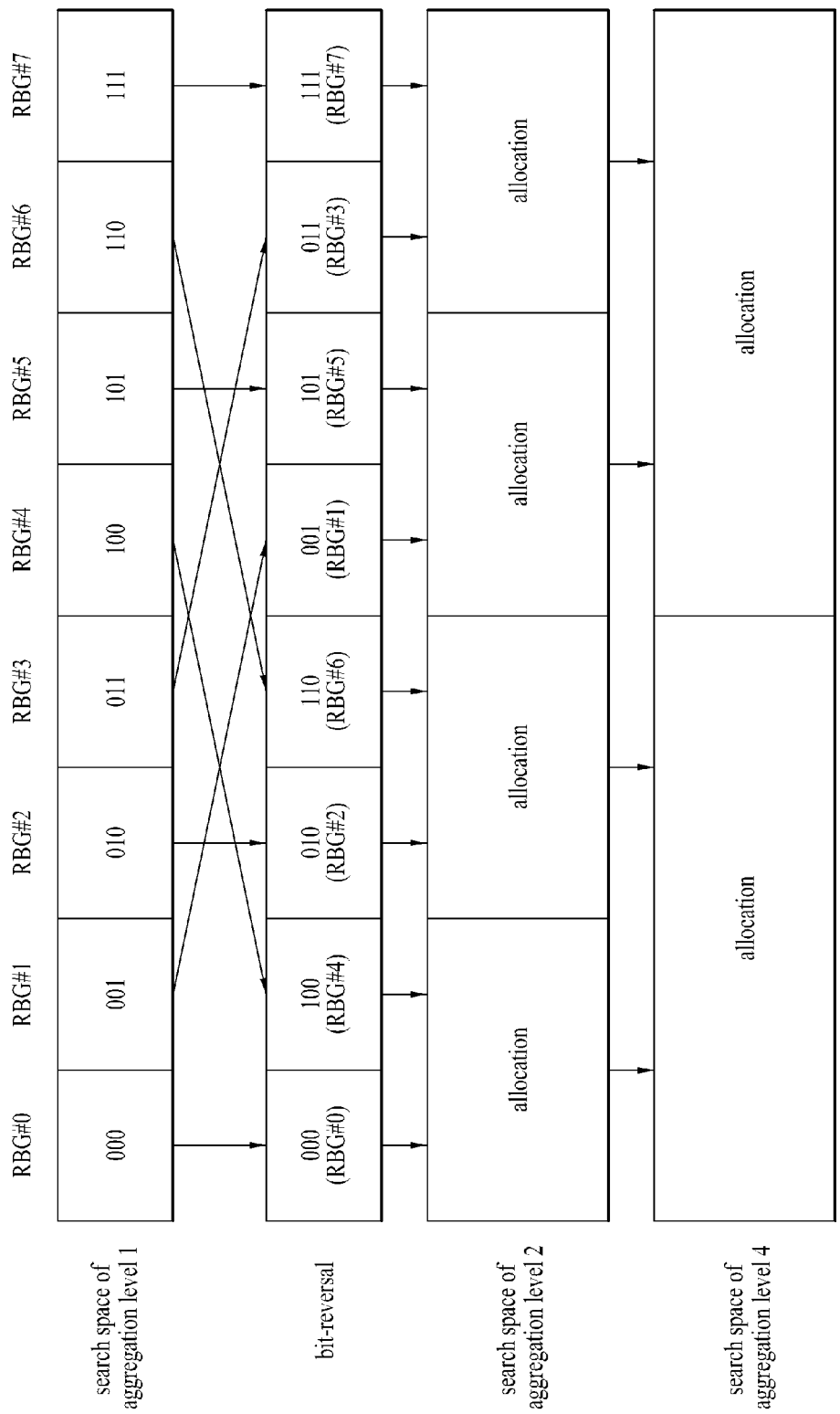

For example, after binary indices are assigned only to RBGs allocated to the search space of aggregation level 1, bit reversal may be applied to the assigned indices and RBGs of 2 adjacent RBG indices among the bit-reversed RBG indices may be grouped and assigned to the search space of aggregation level 2. Here, the term "bit reversal" refers to reversal of the order of bit values of a bit sequence, for example, refers to changing a bit sequence of "abc" to a bit sequence of "cba". FIG. 21 illustrates a method in which 2 adjacent RBGs among RBGs of a lower aggregation level are grouped to constitute a search space of a higher aggregation level while applying bit reversal.

For example, let us assume that 8 RBGs among all RBGs of the system bandwidth are allocated to a search space of aggregation level 1. New indices RBG#0 to RBG#7 are assigned to the 8 RBGs. The newly assigned RBG indices may be represented as binary values 000, 001, 010, 011, 100, 101, 110, and 111. When bit reversal is applied to the binary indices, bit-reversed indices 000, 100, 101, 110, 001, 101, 011, and 111 are obtained. The RBGs may be rearranged in the order of RBG#0, RBG#4, RBG#2, RBG#6, RBG#1, RBG#5, RBG#3, and RBG#7 according to the bit-reversed indices. Here, 2 adjacent RBGs in the reordered RBGs may be grouped to constitute a search space of aggregation level 2. For example, RBG#0 and RGB#4 corresponding to indices 000 and 100 may be grouped to constitute a search space of aggregation level 2. Then, 2 adjacent RBGs among RBGs allocated to the search space of aggregation level 2 may be grouped and allocated to a search space of aggregation level 4. In other words, 4 RBGs which are adjacent among RBGs acquired by bit-reversing and reordering only the RBGs allocated to the search space of aggregation level 1 may be grouped and allocated to a search space of aggregation level 4.

Figure 22:
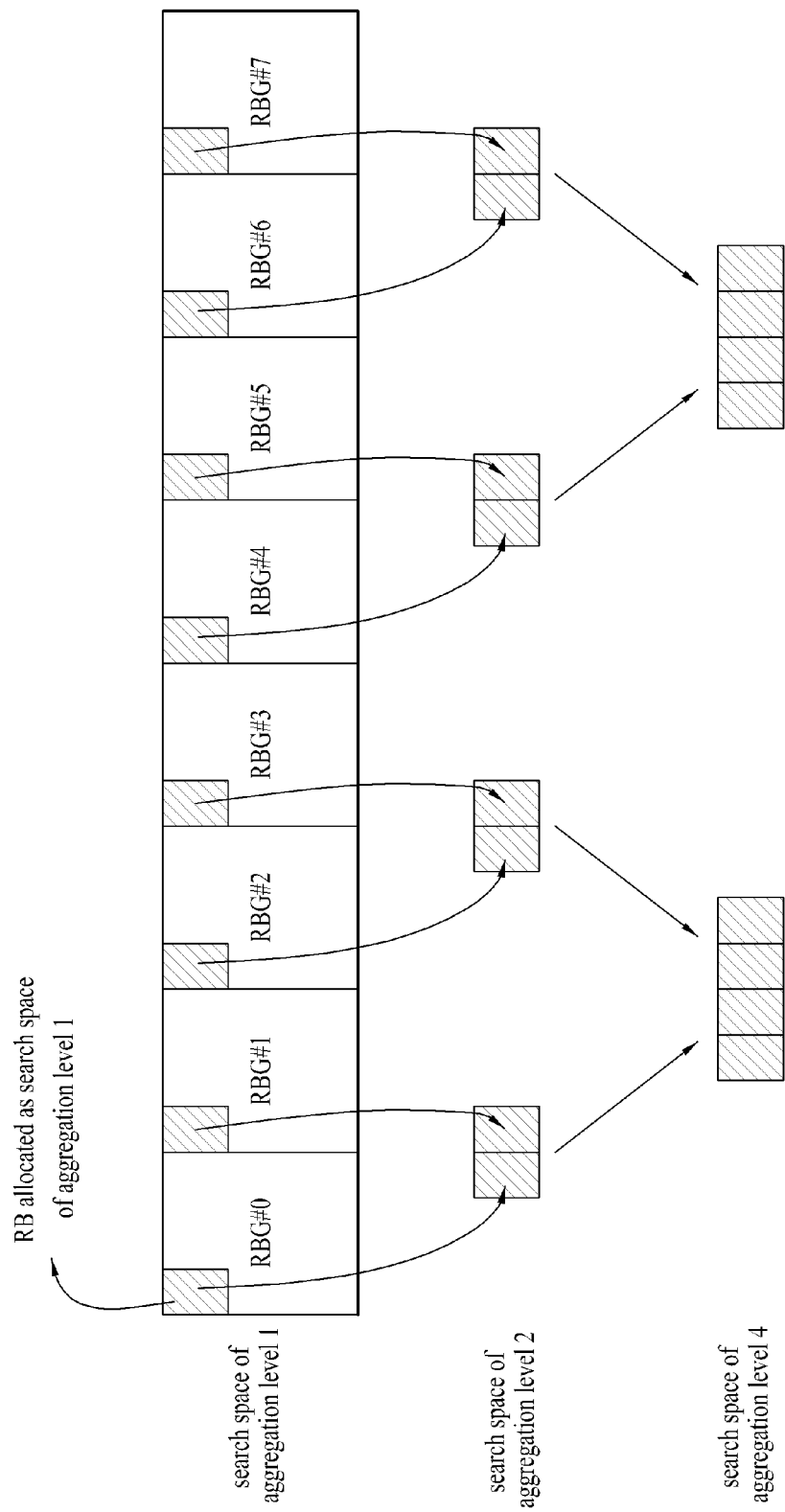
FIGS. 22 and 23 illustrate RBs allocated to an R-PDCCH search space.
Figure 23:
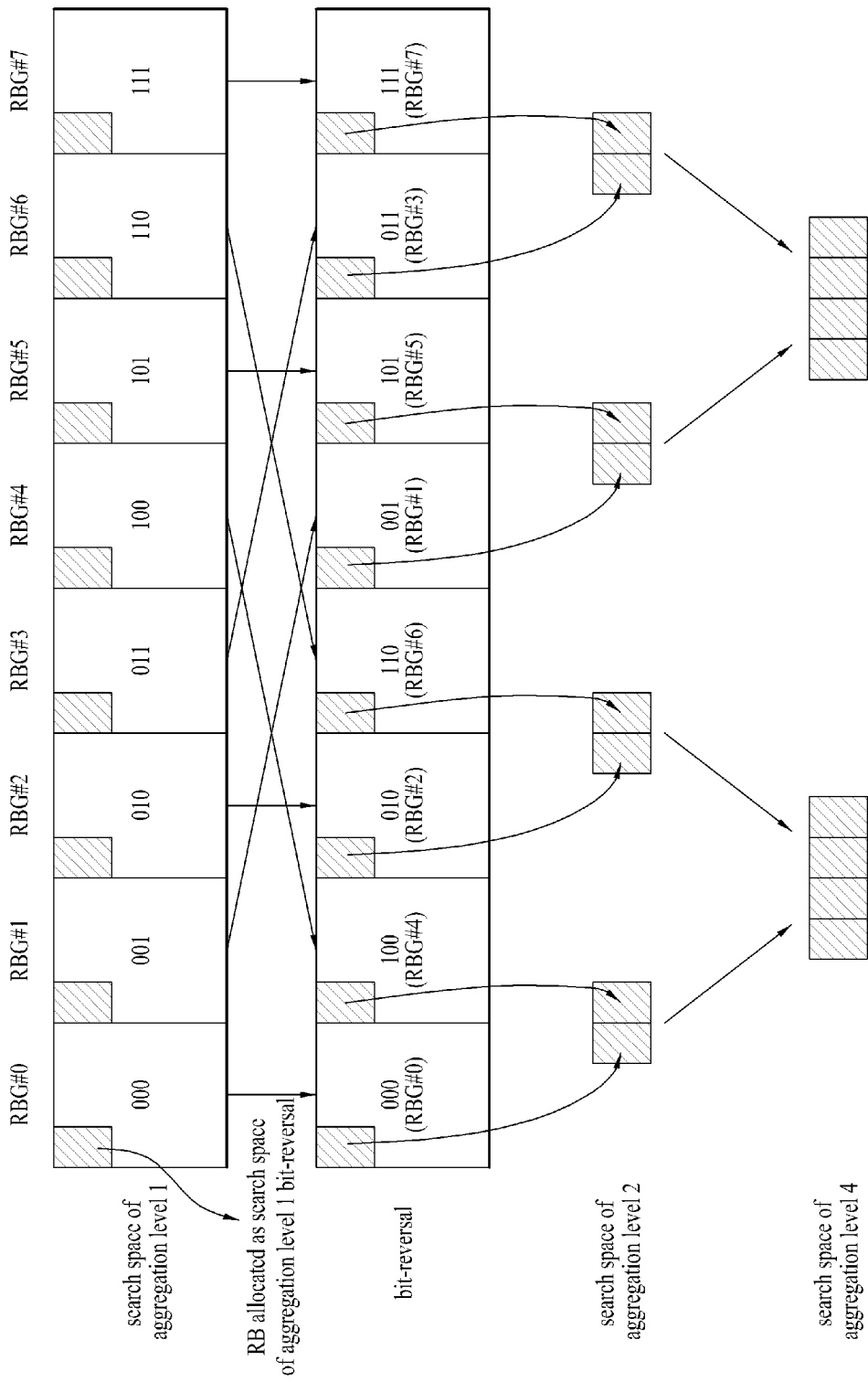

Although design of search spaces of aggregation levels 1, 2, and 4 has been described above on an RBG basis in association with FIGS. 20 and 21 for clear explanation of the basic principle of design of the search spaces of the aggregation levels, one RB at a specified position per RBG allocated to a search space may be allocated to the search space of an R-PDCCH. FIGS. 22 and 23 illustrate RBs that are allocated to an R-PDCCH search space in the R-PDCCH search space allocation methods of FIGS. 20 and 21, respectively. In the examples of FIGS. 22 and 23, the same descriptions as those of FIGS. 20 and 21 are applied except that one RB is specified in a corresponding RBG and redundant descriptions are omitted herein.

Figure 24:
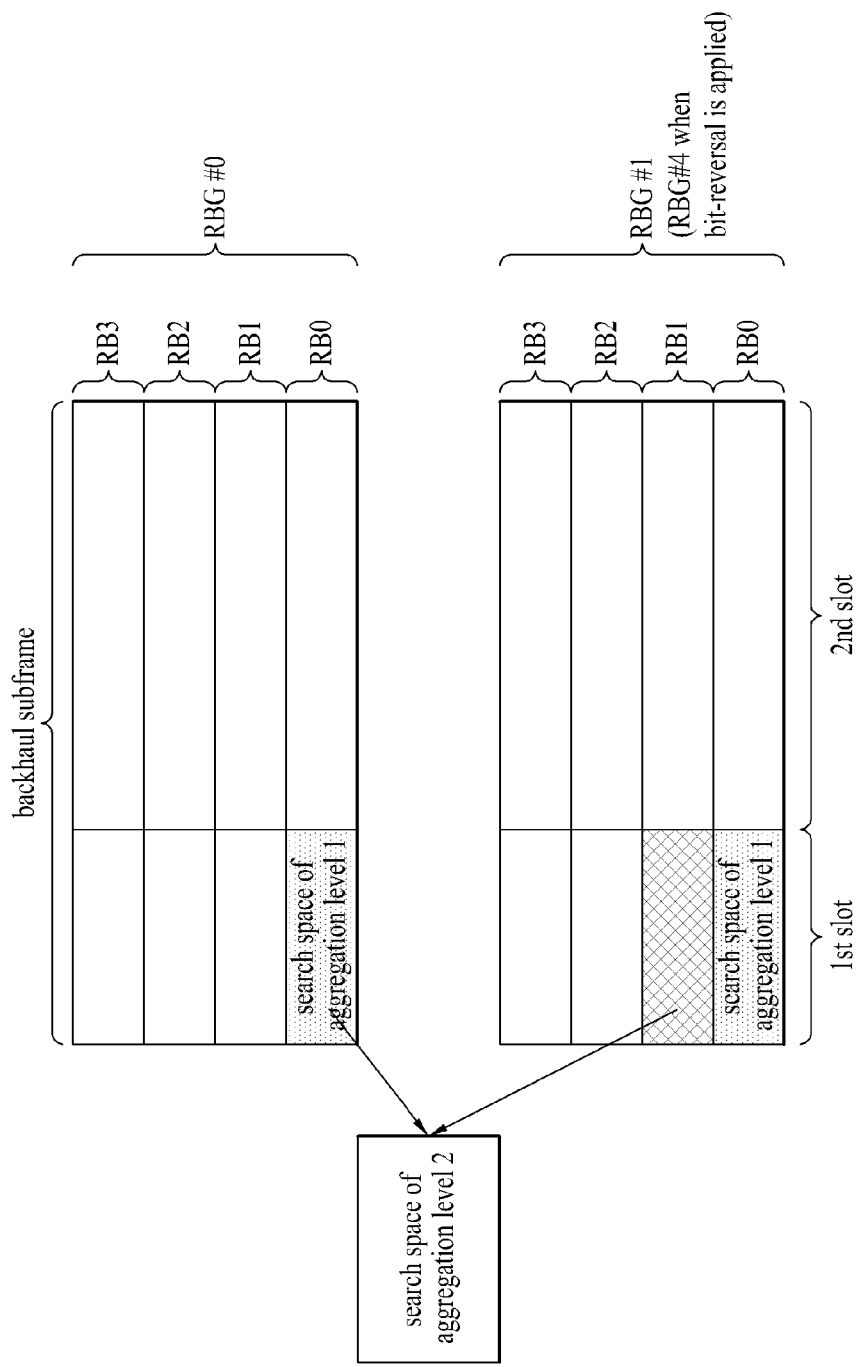
FIGS. 24 to 27 illustrate a method for configuring an R-PDCCH search space according to the present invention.

FIG. 24 illustrates another example of the present invention associated with a method for configuring a search space of a higher aggregation level by grouping 2 adjacent RBGs among RBGs allocated to a search space of a lower aggregation level. In order to maintain consistency with the frequency distributed R-PDCCH transmission scheme and the frequency localized R-PDCCH transmission scheme, a search space of a higher aggregation level is configured using adjacent RBGs among RBGs allocated for a lower aggregation level and RBs which are not allocated for the lower aggregation level are used in some of the adjacent RBGs to increase the aggregation level. For example, as shown in FIG. 24, the same RB as that allocated to the search space of the lower aggregation level may be used in one of the 2 adjacent RBGs and a different RB from that allocated to the search space of the lower aggregation level may be used in the other RB. In this case, the 2 adjacent RBGs may be adjacent RBGs to which reordering such as bit-reversal has not been applied as shown in FIG. 20 and may also be adjacent RBGs to which reordering such as bit-reversal has been applied as shown in FIG. 21. For example, an RBG adjacent to RBG#0 for constituting the search space of aggregation level 1 may be RBG#1 when RBG reordering has not been applied and may be RBG#4 when RBG reordering (for example, bit-reversal) has been applied. In the example of FIG. 24, the search space of aggregation level 2 may be configured using RBs of RBG#0 and RBG#1 such that an RB which has been allocated to the search space of aggregation level 1 is used in RBG#0 and an RB which has not been allocated to the search space of aggregation level 1 is used in RBG#1 (where RBG#4 rather than RBG#1 may be an RBG adjacent to RBG#0).

Here, the RB that has not been allocated to the search space of aggregation level 1 may be an RB that is additionally used in the corresponding RBG in the case of aggregation level 2 in the frequency localized scheme. That is, one RB that is used for the search space of aggregation level 2 in the frequency distributed scheme in the example of FIG. 24 may correspond to an RB (RB1) that is additionally used for the search space of aggregation level 2 in the frequency localized scheme in the example of FIG. 17.

Also, when a search space of aggregation level 4 is configured, an RB which has been allocated to the search space of aggregation level 1 may be used in some of the RBGs (for example, RBG#0) and an RB which has not been allocated to the search space of aggregation level 1 may be used in the remaining RBGs (for example, RBG#1, RBG#2, and RBG#3). For example, a first RB (RB0) of RBG#0, a second RB (RB1) of RBG#1, a third RB (RB2) of RBG#2, and a fourth RB (RB3) of RBG#3 may constitute a single search space of aggregation level 4. Similarly, when a search space of a higher aggregation level is configured while reordering such as bit-reversal is applied to RBGs which constitute the search space of aggregation level 1, an RB which has been allocated to the search space of aggregation level 1 may be used in some of the RBGs (for example, RBG#0) and an RB which has not been allocated to the search space of aggregation level 1 may be used in the remaining RBGs (for example, RBG#4, RBG#2, and RBG#6). For example, a first RB (RB0) of RBG#0, a second RB (RB1) of RBG#4, a third RB (RB2) of RBG#2, and a fourth RB (RB3) of RBG#6 may constitute a single search space of aggregation level 4. In the case in which a search space of a higher aggregation level is configured in this manner, only one CCE index is used even when the aggregation level is 2 or higher and therefore it is possible to prevent waste of PUCCH resources mapped to CCE indices.

In addition, in the method in which 2 adjacent RBGs among RBGs allocated to a search space of a lower aggregation level are grouped to constitute a search space of a higher aggregation level, a 1-bit indicator which indicates which RB is to be used to constitute a search space of a higher aggregation level from among RBs allocated a search space of a lower aggregation level may be used similar to the principle described above with reference to FIG. 18.

Figure 25:
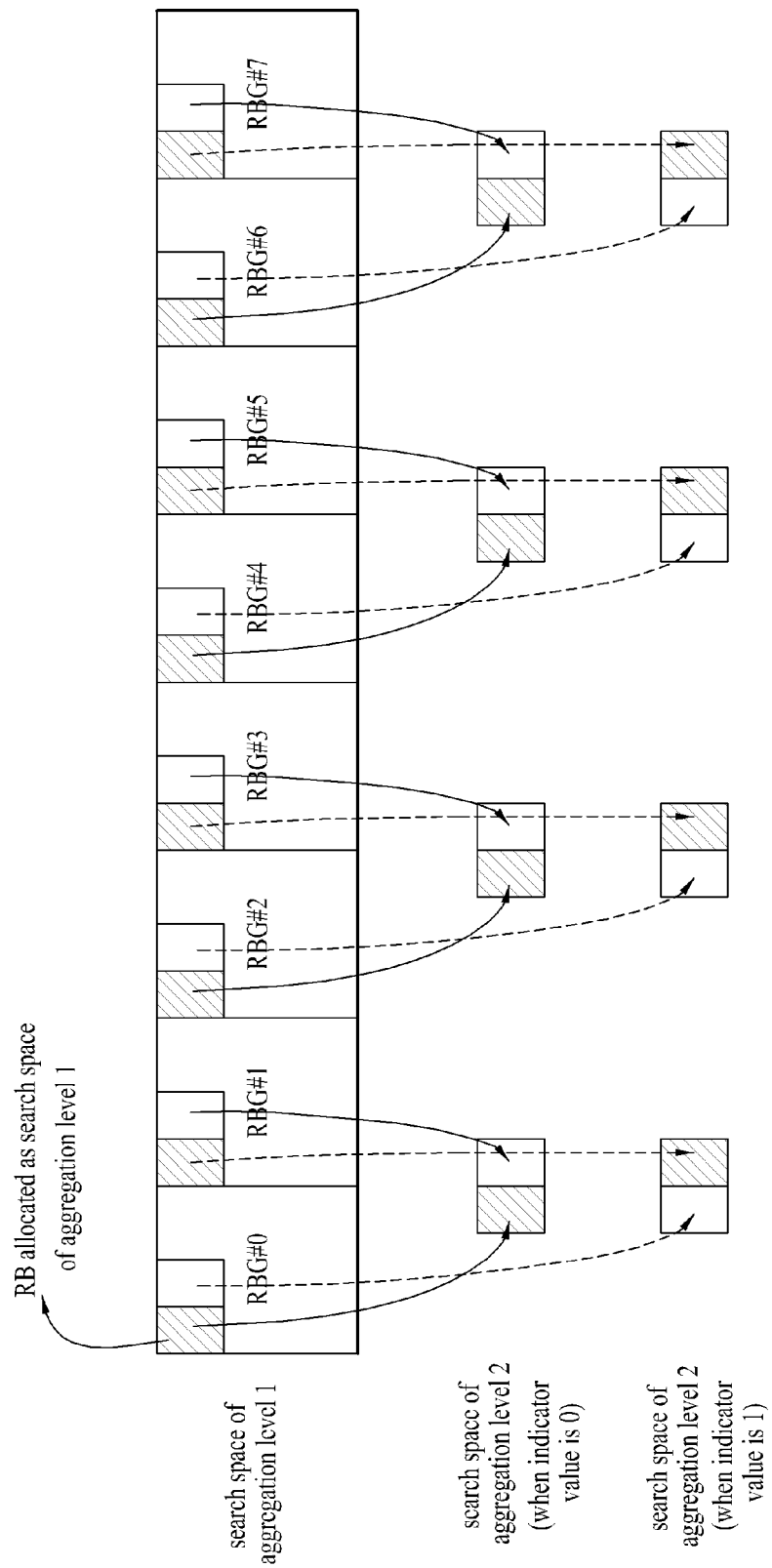

FIG. 25 illustrates an example in which, when such a 1-bit indicator is used, an RB which has been allocated to a search space of aggregation level 1 and an RB which has not been allocated to the search space of aggregation level 1 are grouped to constitute a search space of an aggregation level 2. For example, as shown in FIG. 25, when the value of the 1-bit indicator is 0, an RB which is used for the search space of aggregation level 1 in a front (or earlier) RBG (RBG#0) among 2 adjacent RBGs (RBG#0 and RBG#1) that constitute the search space of aggregation level 1 and an RB which is not used for the search space of aggregation level 1 in a rear (or later) RBG (RBG#1) may be grouped to constitute a search space of aggregation level 2. On the other hand, when the value of the 1-bit indicator is 1, an RB which is not used for the search space of aggregation level 1 in the front RBG (RBG#0) and an RB which is used for the search space of aggregation level 1 in the rear RBG (RBG#1) may be grouped to constitute a search space of aggregation level 2.

Figure 26:
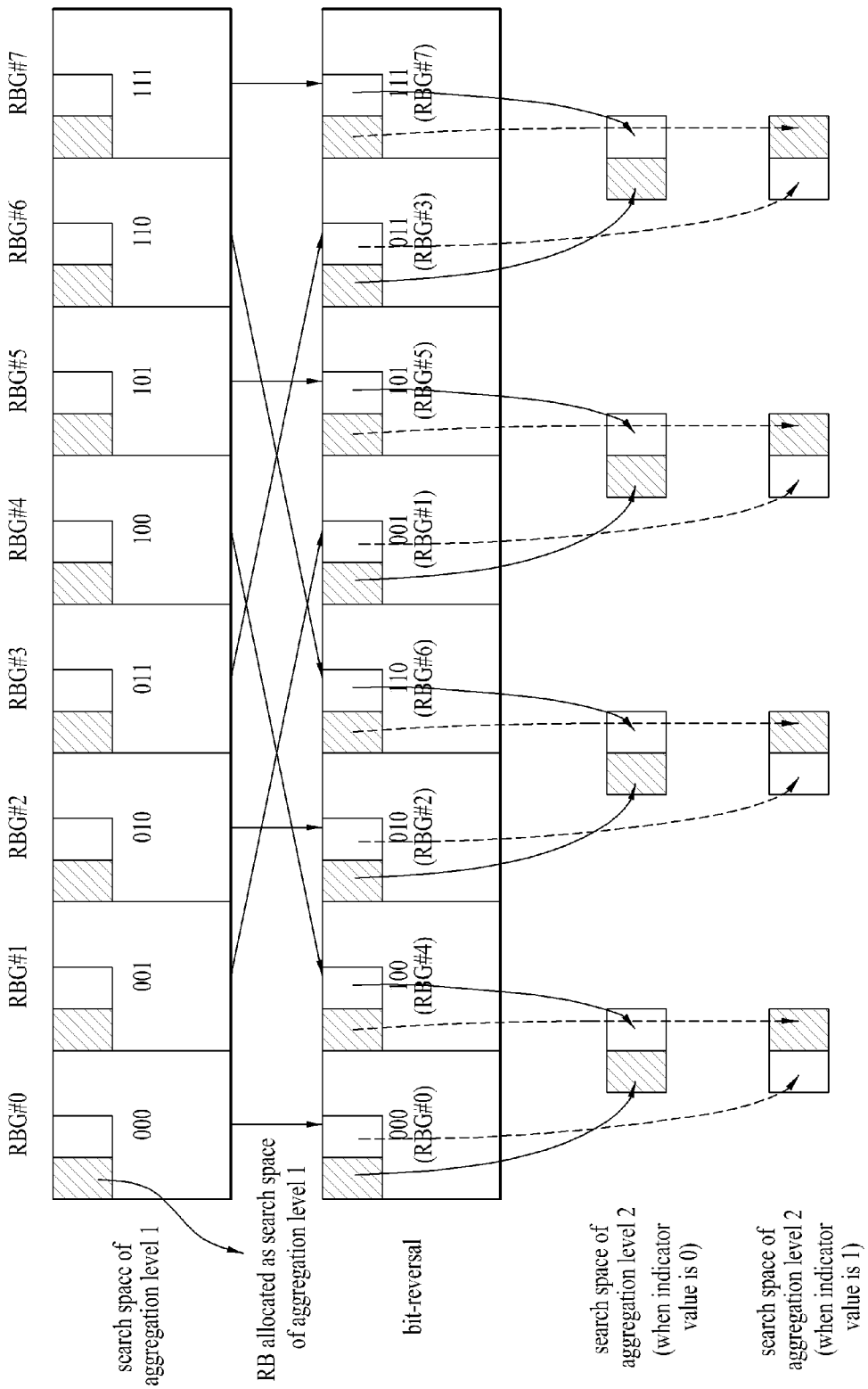

In addition, FIG. 26 illustrates an example in which, when reordering such as bit-reversal is applied, an RB which has been allocated to a search space of aggregation level 1 and an RB which has not been allocated to the search space of aggregation level 1 are grouped to constitute a search space of an aggregation level 2 using a 1-bit indicator. For example, as shown in FIG. 26, when the value of the 1-bit indicator is 0, an RB which is used for the search space of aggregation level 1 in a front (or earlier) RBG (RBG#0) among 2 adjacent RBGs (RBG#0 and RBG#4) that constitute the search space of aggregation level 1 and an RB which is not used for the search space of aggregation level 1 in a rear (or later) RBG (RBG#4) may be grouped to constitute a search space of aggregation level 2. On the other hand, when the value of the 1-bit indicator is 1, an RB which is not used for the search space of aggregation level 1 in the front RBG (RBG#0) and an RB which is used for the search space of aggregation level 1 in the rear RBG (RBG#4) may be grouped to constitute a search space of aggregation level 2.

In addition, an RB which has been allocated to a search space of aggregation level 2 and an RB which has not been allocated to the search space of aggregation level 2 may be grouped to constitute a search space of aggregation level 4 using a predetermined indicator, similar to the principle described above with reference to FIGS. 25 and 26.

Alternatively, when the indicator is fixed to a specific value, an RB which has been allocated to a search space of a lower aggregation level and an RB which has not been allocated to the search space of the lower aggregation level may be grouped to constitute a search space of a higher aggregation level without transmitting the indicator, similar to the principle described above with reference to FIG. 19.

In the following description, a method in which a mapping relationship between distributed-type VRB (CVRB) indices and PRBs described above with reference to Expressions 15 to 17 in the downlink resource allocation type 2 described above is used when a search space of aggregation level 2 or 4 is configured is described below as another example of the present invention associated with a method of configuring a search space according to a frequency distributed scheme. An embodiment of the present invention using the mapping relationship between DVRB indices and PRBs may be described as reordering of RBG indices (or RB indices). For example, one example of the method of the present invention for reordering RBG indices (or RB indices) is a method of reordering RBG indices using a bit-reversal scheme as described above with reference to FIG. 21 and another example is a method of reordering RB indices using the mapping relationship between DVRB indices and PRB indices as described below. However, the present invention is not limited to these examples and may include a method of reordering RBG indices (or RB indices) according to a predetermined rule.

An R-PDCCH of aggregation level 2 or 4 may be configured by connecting PRBs which are adjacent in VRB indices. For example, when a search space of aggregation level 2 is configured using 2 PRBs starting from VRB index t, PRB indices which constitute the search space of aggregation level 2 may be represented as f(t) and f(t+1). The two PRBs may be present in the first slot of a downlink subframe. f( ) is a function for mapping a VRB index to a PRB and defines the mapping relationship between VRB indices and PRB indices as described above with reference to Expressions 15 to 17 in the description of downlink resource allocation type 2.

When a search space of aggregation level 2 or 4 is defined using a mapping relationship between BRB indices and PRB indices in this manner, all VRB indices, each of which is a start index in one search space of aggregation level 2 (i.e., each of which has the smaller value among 2 RBs which constitute the search space of aggregation level 2), may be limited to even or odd indices. Similarly, all VRB indices, each of which is a start index in one search space of aggregation level 4 (i.e., each of which has the smaller value among 4 RBs which constitute the search space of aggregation level 4), may be limited to indices such that remainders when the index values are divided by 4 are equal (or such that the index values are multiples of 4). If such limitation is applied, it is possible to simplify allocation of a search space of a higher aggregation level and to reduce complexity of blind decoding operation.

In addition, when a search space of a higher aggregation level is configured using the method described above, PRB indices n and m which constitute a search space of aggregation level 2 may be restricted so as to satisfy a condition of the following Expression 18.

$$f^{-1}(n)+1=f^{-1}(m)$$ Expression 18

In Expression 18, $f^1(\ )$ denotes a reversed function of f( ) and maps a PRB index to a VRB index. Expression 18 may also be expressed as the following Expression 19.

$$m=f(f^{-1}(n)+1)$$ Expression 19

When a VRB index is mapped to a PRB index according to a DVRB mapping scheme, the mapping relationship is determined by a block interleaver including 4 columns and Nrow rows as described above with reference to FIG. 12. Taking into consideration this, the relation between PRB indices n and m of Expressions 18 and 19 may be determined as shown in the following Expression 20.

$$m = \begin{cases} n + N_{row}, & f(n) = 4t \text{ or } 4t + 2 \text{ for an arbitrary integer } t \\ n + N_{row} - N_{null}/2 + N_{gap} - \tilde{N}_{VRB}^{DL}/2, & \text{otherwise} \end{cases}$$ Expression 20

As shown in Expression 20, the PRB index m may be obtained by adding the row size (Nrow) of the DVRB block interleaver to the PRB index n (after subtracting Nnull/2 for the second or fourth column where a null is present). Here, when the condition of f(n)=4t+1 is satisfied, a next adjacent RB in VRB indices is additionally spaced by a number of RBs (i.e., $N_{gap}-\tilde{N}_{VRB}^{DL}/2$ RBs) which are not used for DVRBs in PRBs.

As a result, when the search space of aggregation level 2 starts from PRB index n, 2 PRB indices n and n+Nrow are determined as a search space of aggregation level 2. In addition, when a search space of aggregation level 4 starts from PRB index n, 4 PRB indices n, n+$N_{row}$, n+2$N_{row}$-$N_{null}$/2+$N_{gap}$-$\tilde{N}_{VRB}^{DL}$/2 and n+3$N_{row}$-$N_{null}$/2+$N_{gap}$-$\tilde{N}_{VRB}^{DL}$/2 are determined as a search space of aggregation level 4. Consequently, PRB indices n and m which constitute a search space of a higher aggregation level may be determined to be the most adjacent PRB indices in VRB indices.

Figure 27:
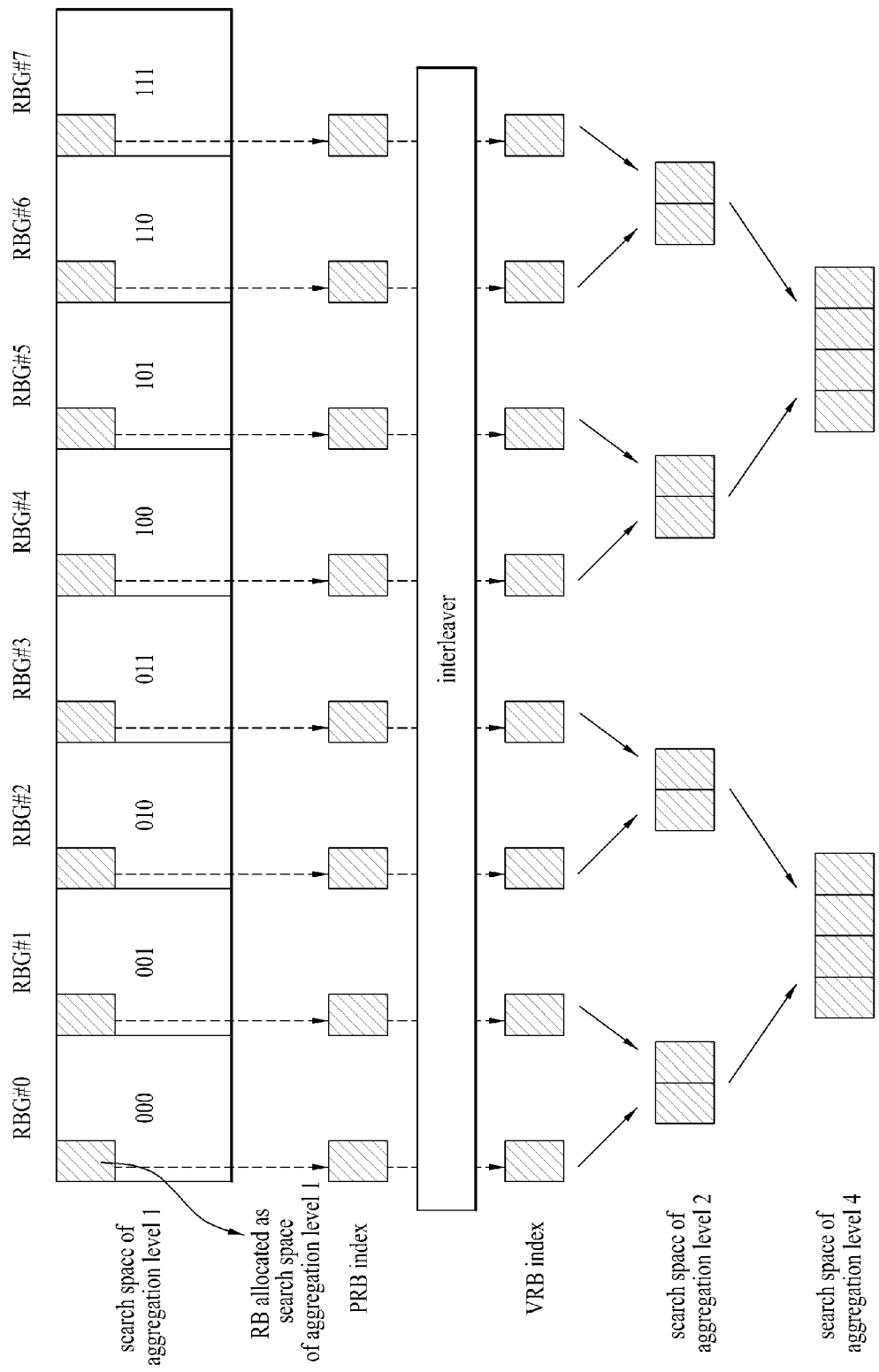

FIG. 27 illustrates an embodiment of the present invention in which RBs that constitute a search space of a higher aggregation level are determined using VRB indices. An eNodeB may reorder PRBs allocated to a search space of aggregation level 1 according to VRB indices using a DVRB block interleaver. For example, PRB indices 0, 1, 2, 3, 4, 5, 6, and 7 may be mapped respectively to VRB indices 0, 4, 1, 5, 2, 6, 3, and 7 and the RB resources may be reordered (or rearranged) according to the VRB indices. 2 adjacent RB resources in VRB indices may construct a search space of aggregation level 2 and 4 adjacent RB resources in VRB indices may construct a search space of aggregation level 4.

In summary, PRBs mapped to 2 adjacent VRB indices may be determined as a search space of aggregation level 2 and PRBs mapped to 4 adjacent VRB indices may be determined as a search space of aggregation level 4. VRB indices and PRB indices may be mapped to each other through the block interleaver described above.

The RN may receive a set of VRB indices of aggregation level 1, as information regarding an R-PDCCH search space (i.e., candidate RB resources in which an R-PDCCH may be transmitted), from the eNodeB. The VRB index set includes VRB indices that are mapped to PRB resources in which an R-PDCCH may be transmitted. VRB indices may be mapped to PRB indices using a block interleaver. An RN which has received the VRB index set may newly assign indices according to the order of VRB indices. The RN may group 2 adjacent RBs based on the newly-assigned indices to determine a search space of aggregation level 2. In addition, the RN may group 4 adjacent RBs based on the newly-assigned indices to determine a search space of aggregation level 4. That is, when the RN has received a set of VRB indices of aggregation level 1 from the eNodeB, the RN may determine 2 adjacent VRB indices to be a search space of aggregation level 2 and determine 4 adjacent VRB indices to be a search space of aggregation level 4 without receiving any indication and perform blind decoding of an R-PDCCH according to each aggregation level.

In addition, for example, it is possible to set a rule for limiting RBs corresponding to 4k, 4k+1, 4k+2. and 4k+3 for a specific integer k in VRB indices such that the RBs corresponding to 4k, 4k+1, 4k+2, and 4k+3 are allocated as a set to a search space or are not allocated to a search space. According to this rule, it is possible to guarantee that a search space of aggregation level 4 is constructed of 4 consecutive RB resources in VRB indices. If such a limitation is applied, it is possible to construct a signaling, which constitutes a search space, in a simple configuration. That is, the eNodeB may signal only a set associated with integer k, thereby reducing signaling overhead and allowing RBs corresponding to 4k, 4k+1, 4k+2, and 4k+3 in VRB indices to be included in a search space.

The following Table 2 illustrates an example of the mapping relationship between PRB indices and VRB indices assuming that the system bandwidth is 32 RBs and one RBG includes 3 RBs. An embodiment of the present invention in which, when VRB indices which constitute a search space of aggregation level 1 is given, PRBs mapped to 2 adjacent VRB indices are determined to be a search space of aggregation level 2 and PRBs mapped to 4 adjacent VRB indices are determined to be a search space of aggregation level 4 is described below with reference to Table 2. In Table 2, each RBG includes 3 consecutive PRBs and RBGs are represented by RBG indices 0 to 10. In this regard, RBG indices 0, 3, 6, 9, ... may constitute RBG subset 0, RBG indices 1, 4, 7, 10, ... may constitute RBG subset 1, and RBG indices 2, 5, 8 ... may constitute RBG subset 2, similar to the method of resource allocation type 1 of FIG. 11(b).

TABLE 2

| PRB index | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| RBG | 0 | 0 | 0 | 1 | 1 | 1 | 2 | 2 | 2 | 3 | 3 | 3 | 4 | 4 | 4 | 5 | 5 | 5 |
| 1st slot | 0 | 4 | 8 | 12 | 16 | 20 | 22 | 24 | 26 | 1 | 5 | 9 | 13 | 17 | −1 | −1 | −1 | −1 |
| 2nd slot | 2 | 6 | 10 | 14 | 18 | 21 | 23 | 25 | 27 | 3 | 7 | 11 | 15 | 19 | −1 | −1 | −1 | −1 |
| PRB index | 18 | 19 | 20 | 21 | 22 | 23 | 24 | 25 | 26 | 27 | 28 | 29 | 30 | 31 | | | | |
| RBG | 6 | 6 | 6 | 7 | 7 | 7 | 8 | 8 | 8 | 9 | 9 | 9 | 10 | 10 | | | | |
| 1st slot | 2 | 6 | 10 | 14 | 18 | 21 | 23 | 25 | 27 | 3 | 7 | 11 | 15 | 19 | | | | |
| 2nd slot | 0 | 4 | 8 | 12 | 16 | 20 | 22 | 24 | 26 | 1 | 5 | 9 | 13 | 17 | | | | |

In Table 2, for example, it is assumed that, for example, PRBs whose VRB indices are 0, 1, 2, 3, 12, 13, 14, and 15 in the 1st slot (i.e., PRB indices 0, 9, 18, 27, 3, 12, 21, 30) are allocated to a search space of aggregation level 1.

In this case, VRB indices 0 and 1 constitute a search space of aggregation level 2 and RBs corresponding to the VRB indices 0 and 1 have PRB indices 0 and 9. Similarly, VRB indices 2 and 3 (PRB indices 18 and 27) may constitute a search space of aggregation level 2, VRB indices 12 and 13 (PRB indices 3 and 12) may constitute a search space of aggregation level 2, and VRB indices 14 and 15 (PRB indices 21 and 30) may constitute a search space of aggregation level 2.

In addition, VRB indices 0, 1, 2, and 3 constitute a search space of aggregation level 4 and RBs corresponding to the VRB indices 0, 1, 2, and 3 have PRB indices 0, 9, 18, and 27. Similarly, VRB indices 12, 13, 14, and 15 (PRB indices 3, 12, 21, and 30) may constitute another search space of aggregation level 4.

The following Table 3 illustrates an example of the present invention in which a DVRB mapping rule is used to determine an R-PDCCH search space.

TABLE 3

| PRB index | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| RBG | 0 | 0 | 0 | 1 | 1 | 1 | 2 | 2 | 2 | 3 | 3 | 3 | 4 | 4 | 4 | 5 | 5 | 5 |
| 1st slot | 0 | 4 | 8 | 12 | 16 | 20 | 22 | 24 | 26 | 1 | 5 | 9 | 13 | 17 | −1 | −1 | −1 | −1 |
| 2nd slot | 2 | 6 | 10 | 14 | 18 | 21 | 23 | 25 | 27 | 3 | 7 | 11 | 15 | 19 | −1 | −1 | −1 | −1 |
| PRB index | 18 | 19 | 20 | 21 | 22 | 23 | 24 | 25 | 26 | 27 | 28 | 29 | 30 | 31 | | | | |
| RBG | 6 | 6 | 6 | 7 | 7 | 7 | 8 | 8 | 8 | 9 | 9 | 9 | 10 | 10 | | | | |
| 1st slot | 2 | 6 | 10 | 14 | 18 | 21 | 23 | 25 | 27 | 3 | 7 | 11 | 15 | 19 | | | | |
| 2nd slot | 0 | 4 | 8 | 12 | 16 | 20 | 22 | 24 | 26 | 1 | 5 | 9 | 13 | 17 | | | | |

A method for determining a search space of an R-PDCCH when the R-PDCCH has not been interleaved (i.e., when an R-PDCCH for only one RN is present in one RB) using a DVRB mapping rule defined in the downlink resource allocation type-2 method in a system in which a system bandwidth of 32 RBs is given and each RBG includes 3 RBs is described below with reference to Table 3. Here, the DVRB mapping rule may be used to determine the positions of RBs (i.e., a search space) where an R-PDCCH can be transmitted rather than being used to schedule resources in which a PDSCH (including an R-PDSCH) is transmitted.

For example, in the example of Table 2, PRBs indicated by PRB indices (i.e., PRB indices 0, 1, 9, 10, 18, 19, 27, and 28) corresponding to VRB indices 0 to 7 of the first slot may be used for R-PDCCH transmission. When the R-PDCCH aggregation levels of all RNs are 1 (i.e., one PRB includes 1 CCE), one R-PDCCH may be transmitted in each PRB. When the R-PDCCH aggregation levels of all RNs are 2, CCEs of aggregation level 2 may be mapped to PRB indices 0 and 1 and other CCEs of aggregation level 2 may be mapped to PRB indices 9 and 10. In this manner, 2 PRBs may be used to transmit 2 CCEs.

The embodiment of the present invention associated with Table 3 has the following differences from the DVRB mapping scheme defined in the conventional downlink resource allocation type 2. First, using the mapping relationship between VRBs and PRBs, PRBs in which an R-PDCCH can be transmitted may be specified and VRBs may then be sequentially mapped to the specified PRBs. Namely, the mapping relationship between VRBs and PRBs may be used only to determine PRBs (R-PDCCH PRBs) in which an R-PDCCH can be transmitted and VRB indices that have been used to specify R-PDCCH PRBs may not be used to determine which PRBs constitute a search space according to the aggregation level. For example, while VRB indices are used to determine PRBs in which an R-PDCCH can be transmitted, PRB indices may be used to determine which PRBs in which an R-PDCCH of a specific aggregation level is actually transmitted. In another sense, VRB indices may be newly mapped to PRB indices in increasing order of PRB indices of R-PDCCH PRBs and a search space of aggregation level 2 may be determined through RBs corresponding to 2 VRB indices which are adjacent to each other in the newly-mapped VRB indices. In the example of Table 3, R-PDCCH PRBs may be determined to be PRBs corresponding to VRB indices 0 to 7 (PRB indices 0, 1, 9, 10, 18, 19, 27, and 28) according to the DVRB mapping rule and, if VRB indices are newly-assigned in increasing order of PRB indices, the PRB indices 0, 1, 9, 10, 18, 19, 27, and 28 are mapped to the newly-assigned VRB indices 0, 1, 2, 3, 4, 5, 6, and 7. The search space of aggregation level 2 may include the newly-assigned VRB indices 0 and 1 (PRB indices 0 and 1), VRB indices 2 and 3 (PRB indices 9 and 10), VRB indices 4 and 5 (PRB indices 18 and 19), and VRB indices 6 and 7 (PRB indices 27 and 28).

In addition, when a non-interleaved R-PDCCH search space is determined, slot-based cyclic hopping may not be performed in the second slot.

When a number of aggregation levels are present together, R-PDCCH PRBs may be determined according to the DVRB mapping rule and logical CCEs or VRB indices may be mapped to the determined R-PDCCH PRBs. That is, when the aggregation level is L, L CCEs may be assigned to L adjacent PRBs among the determined R-PDCCH PRBs (i.e., to L RBs which are adjacent to each other in the newly assigned VRB indices).

Next, an example of the present invention in which a VRB index at which a search space of a specific aggregation level starts is determined is described as follows.

As shown in Tables 2 and 3, PRBs corresponding to VBR indices corresponding to 4k, 4k+1, 4k+2, and 4k+3 for a specific integer k are mapped to different RBGs (each of which includes 3 RBs) and a PRB mapped to VRB index 4k+4 is mapped to the same RBG as the PRB corresponding to the VRB index 4k. For example, PRBs corresponding to VRB indices 0, 1, 2, and 3 are mapped respectively to RBGs 0, 3, 6, and 9 and a PRB corresponding to VRB index 4 is mapped to the same RBG 0 as the PRB corresponding to the VRB index 0. Here, the above mapping rule between VRB indices and RBGs may not be directly applicable when the VRB index value is greater than the system bandwidth (i.e., the total number of RBs). In this case, an RBG to which the corresponding VRB index is mapped may be specified as an exception.

Taking into consideration such a DVRB mapping rule, a search space of aggregation level 1 may be configured using one RB per RBG by determining candidate positions at which an R-PDCCH of aggregation level 1 can be transmitted by limiting corresponding VRB indices to a set of specific values. For example, candidate R-PDCCH positions of aggregation level 1 may be represented as PRBs corresponding to VRB indices 4k, 4k+1, 4k+2, and 4k+3 and may be limited so as to satisfy the condition of the following Expression 21.

$$k = h \cdot P + \text{offset} \qquad \text{Expression 21}$$

In Expression 21, h is an arbitrary (or specific) integer and P is RBG size. In addition, offset is given as an integer which is equal or greater than 0 and less than 4 and corresponds to a value determining which PRB is selected per RBG from among PRBs of the RBG. This offset value may be delivered to the RN through a higher layer signal or may be implicitly determined by a parameter such as a cell ID. For example, in the example of Tables 2 and 3, if the offset value is 0, a set of VRB indices corresponding to candidate positions of aggregation level 1 is {0, 1, 2, 3, 12, 13, 14, 15, 22, 23}.

In this case, the candidate R-PDCCH positions of aggregation level 2 may be limited so as to use VRB indices 4k and 4k+1 or VRB indices 4k+2 and 4k+3 for k which satisfies the above condition. That is, a search space of aggregation level 2 may be configured such that an R-PDCCH of aggregation level 1 is transmitted in PRBs corresponding to 2 consecutive VRB indices starting from an even VRB index among VRB indices of a search space of aggregation level 1. For example, an R-PDCCH of aggregation level 2 may be transmitted in PRBs corresponding to VRB indices {0, 1}, {2, 3}, {12, 13}, {14, 15}, or {22, 23}.

Similarly, a search space of aggregation level 4 may be configured such that an R-PDCCH of aggregation level 1 is transmitted in PRBs corresponding to VRB indices 4k, 4k+1, 4k+2, and 4k+3 for k which satisfies the above condition as candidate R-PDCCH positions of aggregation level 4. For example, an R-PDCCH of aggregation level 4 may be transmitted in PRBs corresponding to VRB indices {0, 1, 2, 3} or {12, 13, 14, 15}.

The candidate R-PDCCH position determination method described above may be applied to a frequency localized R-PDCCH transmission scheme in order to maintain consistency with the R-PDCCH search space setting scheme. In this case, the LVRB mapping rule may be applied to VRB-to-PRB mapping.

Although the positions of RBs corresponding to a search space of aggregation level 1 may be determined according to a predetermined relationship in the above description of the present invention, the present invention is not limited thereto and the eNodeB may directly signal which RBs correspond to the search space of aggregation level 1 through a higher layer. In this case, the R-PDCCH search space may be defined using a scheme of mapping between a specific set of RB indices and RBs in which an R-PDCCH can be transmitted.

The following is a description of another example of the present invention associated with search space setting. First, an R-PDCCH search space is defined using a scheme of mapping between an RB index set $\{n_1, n_2, \ldots, n_N\}$ and RBs and the RB mapping scheme is classified into a frequency localized scheme and a frequency distributed scheme.

In the case of the frequency localized scheme, an R-PDCCH of aggregation level 1 may be transmitted in (PRBs of) PRB indices $n_1, n_2, \ldots, n_N$. If N exceeds the number of blind decodings allocated to aggregation level 1, PRB positions at which an R-PDCCH can be transmitted may be limited to PRBs corresponding to the maximum number of blind decodings of the aggregation level 1. In the case of aggregation level 2, one candidate R-PDCCH position may be defined through a combination of 2 PRBs of PRB indices $n_1$ and $n_1+1$. Similarly, the remaining candidate R-PDCCH positions may be defined through a combination of $n_2$ and $n_2+1, \ldots$, and a combination of $n_N$ and $n_N+1$. Similar to the case of aggregation level 1, an R-PDCCH search space may be limited to PRBs corresponding to the maximum number of blind decodings of aggregation level 2. Next, in the case of aggregation level 4, one candidate position may be defined through a combination of 4 PRBs of $n_1, n_1+1, n_1+2$, and $n_1+3$. Here, PRB index $n_1+1$ may indicate a next PRB in PRB indices in which an R-PDCCH can be transmitted. If PRBs in which an R-PDCCH can be transmitted are limited to a specific set through setting by the eNodeB, the PRB index $n_1+1$ may be interpreted (or determined) as corresponding to a PRB whose PRB index is greater than and closest to $n_1$ among PRBs belonging to the specific set. The same interpretation may be applied to $n_1, n_1+1, n_1+2$, and $n_1+3$.

In the case of the frequency distributed scheme, an R-PDCCH of aggregation level 1 may be transmitted in VRB indices $n_1, n_2, \ldots, n_N$. If N exceeds the number of blind decodings allocated to aggregation level 1, VRB positions at which an R-PDCCH can be transmitted may be limited to VRBs corresponding to the maximum number of blind decodings of the aggregation level 1. In the case of aggregation level 2, one candidate R-PDCCH position may be defined through a combination of 2 VRB indices $n_1$ and $n_1+1$. Similarly, the remaining candidate R-PDCCH positions may be defined through a combination of $n_2$ and $n_2+1, \ldots$, and a combination of $n_N$ and $n_N+1$. Similar to the case of aggregation level 1, an R-PDCCH search space may be limited to the maximum number of blind decodings of aggregation level 2. Next, in the case of aggregation level 4, one candidate position may be defined through a combination of 4 VRBs of $n_1, n_1+1, n_1+2$, and $n_1+3$. Here, VRBs may be mapped to PRBs according to the bit-reversal scheme or DVRB mapping scheme described above.

The following is a description of another example of the present invention associated with search space setting. An R-PDCCH search space is defined using a scheme of mapping between an RB index set $\{n_1, n_2, \ldots, n_N\}$ and RBs and the RB mapping scheme is classified into a frequency localized scheme and a frequency distributed scheme.

In the case of the frequency distributed scheme, an R-PDCCH of aggregation level 1 may be transmitted in (PRBs of) PRB indices $n_1, n_2, \ldots, n_N$. If N exceeds the number of blind decodings allocated to aggregation level 1, PRB positions at which an R-PDCCH can be transmitted may be limited to PRBs corresponding to the maximum number of blind decodings of the aggregation level 1. In the case of aggregation level 2, one candidate R-PDCCH position may be defined through a combination of 2 PRBs of PRB indices $n_1$ and $n_2$. Similarly, the remaining candidate R-PDCCH positions may be defined through a combination of $n_3$ and $n_4, \ldots$, and a combination of $n_{N-1}$ and $n_N$. Similar to the case of aggregation level 1, an R-PDCCH search space may be limited to PRBs corresponding to the maximum number of blind decodings of aggregation level 2. Next, in the case of aggregation level 4, one candidate position may be defined through a combination of 4 PRBs of $n_1, n_2, n_3$, and $n_4$.

In the case of the frequency distributed scheme, an R-PDCCH of aggregation level 1 may be transmitted in VRB indices $n_1, n_2, \ldots, n_N$. If N exceeds the number of blind decodings allocated to aggregation level 1, VRB positions at which an R-PDCCH can be transmitted may be limited to VRBs corresponding to the maximum number of blind decodings of the aggregation level 1. In the case of aggregation level 2, one candidate R-PDCCH position may be defined through a combination of 2 VRB indices $n_1$ and $n_2$. Similarly, the remaining candidate R-PDCCH positions may be defined through a combination of $n_3$ and $n_4, \ldots$, and a combination of $n_{N-1}$ and $n_N$. Similar to the case of aggregation level 1, an R-PDCCH search space may be limited to the maximum number of blind decodings of aggregation level 2. Next, in the case of aggregation level 4, one candidate position may be defined through a combination of 4 VRBs of $n_1, n_2, n_3$, and $n_4$. In other words, when a VRB index set of N VRBs is given as $\{n_1, n_2, \ldots, n_N\}$, candidate R-PDCCH positions of aggregation level L may be defined as $\{n_1, n_2, \ldots, n_L\}, \{n_{L+1}, n_{L+2}, \ldots, n_{2L}\}, \{n_{2L+1}, n_{2L+2}, \ldots, n_{3L}\}, \ldots \{n_{N-L+1}, n_{N-L+2}, \ldots, n_N\}$. Alternatively, when a VRB index set of N VRBs is given as $\{n_0, n_1, \ldots, n_{N-1}\}$, candidate R-PDCCH positions of aggregation level L may be defined as $\{n_0, n_1, \ldots, n_{L-1}\}, \{n_L, n_{L+1}, \ldots, n_{2L-1}\}, \{n_{2L}, n_{2L+2}, \ldots, n_{3L-1}\}, \ldots \{n_{N-L}, n_{N-L+1}, \ldots, n_{N-1}\}$.

When candidate R-PDCCH positions or a search space of each aggregation level have been determined as described above, a set of R-PDCCH start positions may be provided for each aggregation level. When a set of start positions for aggregation level L is referred to as Set L, a set of start positions for each aggregation level may be configured such that Set $1=\{n_{1,1}, n_{2,1}, \ldots, n_{N,1}\}$, Set $2\{(n_{1,2}, n_{2,2}, \ldots, n_{N,2}\}$, Set $4=\{n_{1,4}, n_{2,4}, \ldots, n_{N,4}\}, \ldots$. Here, although a set of start positions of each aggregation level may be configured to be mutually exclusive, each set may share some elements or one set may include another set in order to efficiently utilize resources and to reduce signaling overhead. For example, Set 1 may include Set 2 or Set 1 may include Set 4. In this case, Set 2 may not necessarily include Set 4.

In addition, a set of start positions of each aggregation level may be set so as to satisfy a predetermined relationship between the start position sets of aggregation levels in order to further reduce overhead of signaling which indicates the search space. In the case in which such a relationship is defined and applied, the receiving side can determine signaling information of another set when signaling information of one set has been provided to the receiving side.

In order to reduce signaling overhead, it is also possible to signal only the start position and length of a search space rather than to directly signal RB positions which constitute the search space. Accordingly, it is possible to more efficiently perform a resource multiplexing operation with the existing downlink resource allocation scheme.

In addition, it is possible to apply a method in which only one start position set is defined and the value of element n of the set is set and interpreted as indicating the start position and length. For example, elements of such a set may have values of 0 to 119 as shown in the following Table 4 and each element may be set to indicate a corresponding start position (S) and length (L).

TABLE 4

| L | S=0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 1 | 0 | 1 | 2 | 3 | 4 | 5 | 6 | 7 | 8 | 9 | 10 | 11 | 12 | 13 | 14 |
| 2 | 15 | 16 | 17 | 18 | 19 | 20 | 21 | 22 | 23 | 24 | 25 | 26 | 27 | 28 | 29 |
| 3 | 30 | 31 | 32 | 33 | 34 | 35 | 36 | 37 | 38 | 39 | 40 | 41 | 42 | 43 | 44 |
| 4 | 45 | 46 | 47 | 48 | 49 | 50 | 51 | 52 | 53 | 54 | 55 | 56 | 57 | 58 | 59 |
| 5 | 60 | 61 | 62 | 63 | 64 | 65 | 66 | 67 | 68 | 69 | 70 | 71 | 72 | 73 | 74 |
| 6 | 75 | 76 | 77 | 78 | 79 | 80 | 81 | 82 | 83 | 84 | 85 | 86 | 87 | 88 | 89 |
| 7 | 90 | 91 | 92 | 93 | 94 | 95 | 96 | 97 | 98 | 99 | 100 | 101 | 102 | 103 | 104 |
| 8 | 105 | 106 | 107 | 108 | 109 | 110 | 111 | 112 | 113 | 114 | 115 | 116 | 117 | 118 | 119 |
| 9 | 119 | 118 | 117 | 116 | 115 | 114 | 113 | 112 | 111 | 110 | 109 | 108 | 107 | 106 | 105 |
| 10 | 104 | 103 | 102 | 101 | 100 | 99 | 98 | 97 | 96 | 95 | 94 | 93 | 92 | 91 | 90 |
| 11 | 89 | 88 | 87 | 86 | 85 | 84 | 83 | 82 | 81 | 80 | 79 | 78 | 77 | 76 | 75 |
| 12 | 74 | 73 | 72 | 71 | 70 | 69 | 68 | 67 | 66 | 65 | 64 | 63 | 62 | 61 | 60 |
| 13 | 59 | 58 | 57 | 56 | 55 | 54 | 53 | 52 | 51 | 50 | 49 | 48 | 47 | 46 | 45 |
| 14 | 44 | 43 | 42 | 41 | 40 | 39 | 38 | 37 | 36 | 35 | 34 | 33 | 32 | 31 | 30 |
| 15 | 29 | 28 | 27 | 26 | 25 | 24 | 23 | 22 | 21 | 20 | 19 | 18 | 17 | 16 | 15 |

For example, when an element of the set has a value of 47, this may indicate that the start position S is 2 and the length L is 4. The value of length L of "4" also indicates that the search space is a search space of aggregation level 4. For example, if the element 47 (i.e., the element having a value of "47") is given when RB indices (VRB indices, PRB indices, or arbitrary RB indices) which indicate RBs constituting an R-PDCCH search space are configured as {0, 1, 2, 3, 4, 5, 6, 7, . . . }, it may be interpreted (or determined) that RBs corresponding to RB indices 2, 3, 4, and 5 constitute a search space of aggregation level 4. In the case in which such a set is configured, there is no need to configure an individual set of each aggregation level and there is also no need to provide additional information for discriminating the search space of each aggregation level.

The eNodeB may transmit information indicating which R-PDCCH transmission scheme is used among the two R-PDCCH transmission schemes described above (i.e., the frequency localized scheme and the frequency distributed scheme) to the RN through a higher layer signal. Alternatively, the eNodeB may not provide information indicating the R-PDCCH transmission scheme to the RN but instead the RN may operate to perform blind decoding on both R-PDCCH transmission schemes to determine which transmission scheme is used among the two transmission schemes. For example, a part of the entire search space of aggregation level 2 may be configured as resources of the same RBG and the remaining part may be configured as resources of different RBGs and the RN may perform blind decoding on the assumption that both transmission schemes are used.

Figure 28:
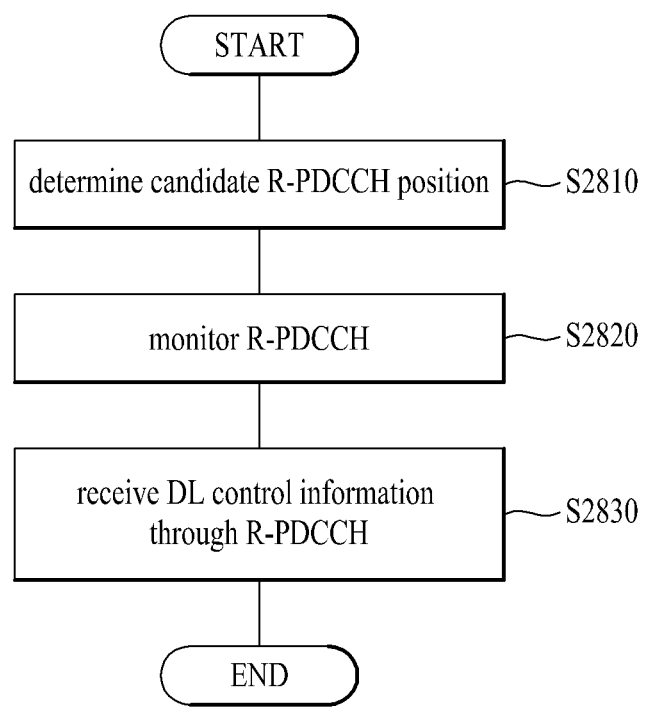
FIG. 28 is a flowchart illustrating an exemplary method for transmitting and receiving an R-PDCCH.

FIG. 28 is a flowchart illustrating an exemplary method for transmitting and receiving an R-PDCCH.

In step S2810, an RN may determine candidate positions of an R-PDCCH which is transmitted in a first slot and a second slot of a downlink subframe. For example, candidate R-PDCCH positions may be set as a VRB set including N VRBs which may be provided to the RN through a higher layer signal. Since one candidate R-PDCCH position of a higher aggregation level may be constructed of 2 adjacent candidate positions among candidate R-PDCCH positions of a lower aggregation level, the RN may determine candidate R-PDCCH positions of the higher aggregation level from the VRB set without receiving any signaling. Specifically, upon acquiring information regarding the VRB set, the RN may assign numbers $\{n_0, n_1, \ldots, n_{N-1}\}$ to VRB indices, starting from the lowest VRB index and ending with the highest VRB index, and may then determine candidate R-PDCCH positions of each aggregation level L as VRBs of $\{n_0, n_1, \ldots, n_{L-1}\}$, $\{n_L, n_{L+1}, \ldots, n_{2L-1}\}$, $\{n_{2L}, n_{2L+1}, \ldots, n_{3L-1}\}, \ldots \{n_{N-L}, n_{N-L+1}, \ldots, n_{N-1}\}$. Here, the same VRB set may be set in the first slot and the second slot of the downlink subframe.

In step S2820, the RN may monitor whether or not an R-PDCCH is being transmitted in a PRB mapped to a VRB that has been determined as a candidate R-PDCCH position in step S2810. For example, the PRB and the VRB may be determined according to the DVRB mapping rule and the distributed VRB-to-PRB mapping relationship may be provided to the RN through a higher layer signal.

In step S2830, upon determining through monitoring that an R-PDCCH is being transmitted, the RN may receive downlink control information included in the R-PDCCH. The downlink control information may be downlink allocation information or uplink grant information, the downlink allocation information may be included in the R-PDCCH transmitted in the first slot, and the uplink grant information may be included in the R-PDCCH transmitted in the second slot. Here, the R-PDCCH for the RN is not interleaved with an R-PDCCH for another RN. That is, it is assumed in the example of the present invention that an R-PDCCH of only one RN is present in one RB.

Each of the various embodiments of the present invention described above may be independently applied or 2 or more thereof may be simultaneously applied to the RN R-PDCCH monitoring and reception method according to the present invention described above with reference to FIG. 28 and redundant descriptions are omitted herein for clear explanation of the present invention.

Although the various examples of the present invention have been described above mainly with reference to control channel transmission from an eNodeB to an RN, it will be apparent to those skilled in the art that the principles suggested by the present invention may be applied to an arbitrary downlink transmission entity (eNodeB or RN) and an arbitrary downlink reception entity (UE or RN). For example, suggestions of the present invention associated with downlink transmission from an eNodeB to an RN may be equally applied to downlink transmission from an eNodeB to a UE or from an RN to a UE. In addition, for example, suggestions of the present invention associated with reception of a downlink from an eNodeB by an RN may be equally applied to reception of a downlink from an eNodeB by a UE or reception of a downlink from an RN by a UE. Specifically, the various embodiments suggested by the present invention may be equally applied to an embodiment in which, when an arbitrary downlink reception entity performs blind decoding of a control channel (for example, an advanced-PDCCH) in a first slot and/or a second slot of a downlink subframe, the downlink reception entity operates to determine a candidate position at which the control channel can be transmitted and to monitor the control channel to receive and acquire downlink control information through the control channel.

Figure 29:
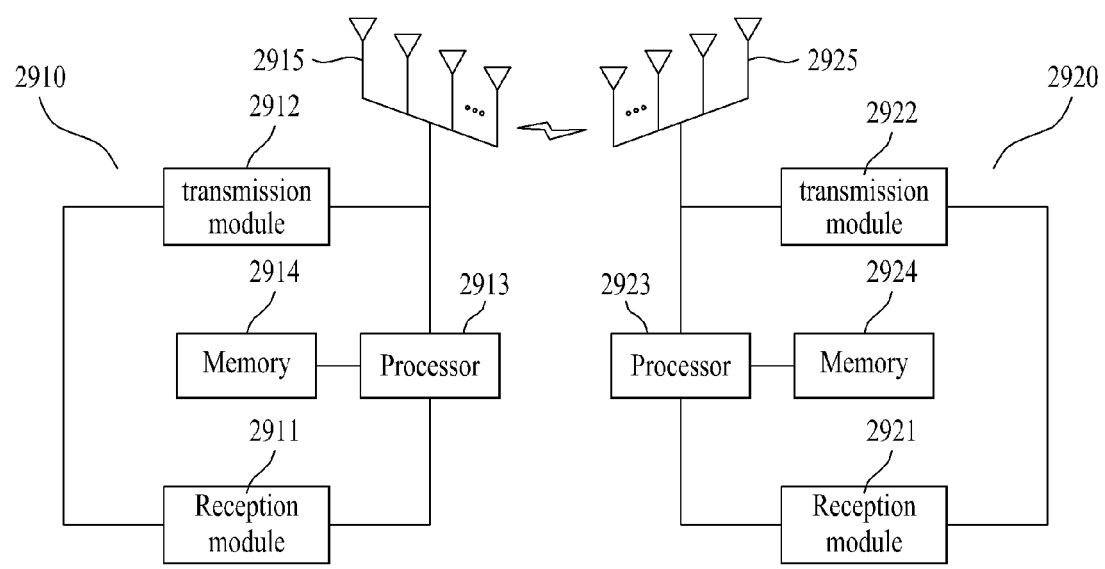
FIG. 29 illustrates a configuration of an RN according to an embodiment of the present invention.

FIG. 29 illustrates a configuration of an eNodeB and an RN according to the present invention.

As shown in FIG. 29, an eNodeB 2910 according to the present invention may include a reception module 2911, a transmission module 2912, a processor 2913, a memory 1914, and multiple antennas 2915. The multiple antennas 2915 indicate that the eNodeB supports MIMO transmission and reception. The reception module 2911 may receive various uplink signals, data, and information from a UE or an RN. The transmission module 2912 may transmit various downlink signals, data, and information to the UE or RN. The processor 2913 may control overall operation of the eNodeB 2910.

The eNodeB 2910 according to an embodiment of the present invention may be configured so as to transmit a control channel to an arbitrary reception entity. The processor 2913 of the eNodeB may be configured so as to provide a set of VRBs at candidate positions at which a control channel can be transmitted to a downlink reception entity when transmitting the control channel in a first slot and/or a second slot ofa downlink subframe. When the eNodeB transmits downlink control information (a downlink allocation and/or an uplink grant) through a control channel, the downlink reception entity may acquire downlink control information through the control channel by performing blind decoding at each candidate position at which the control channel can be transmitted.

The processor 2913 of the eNodeB 2910 may also perform a function such as arithmetic processing on information received by the eNodeB 2910, information to be externally transmitted, or the like and the memory 2914 may store arithmetically processed information or the like for a predetermined time and may be replaced with a component such as a buffer (not shown).

As shown in FIG. 29, the RN 2920 according to the present invention may include a reception module 2921, a transmission module 2922, a processor 2923, a memory 1914, and multiple antennas 2925. The multiple antennas 2925 indicate that the RN supports MIMO transmission and reception. The reception module 2921 may include a first reception module and a second reception module. The first reception module may receive various downlink signals, data, and information from the eNodeB and the second reception module may receive various uplink signals, data, and information from a UE. The transmission module 2922 may include a first transmission module and a second transmission module. The first transmission module may transmit various uplink signals, data, and information to the eNodeB and the second transmission module may transmit various downlink signals data, and information to the UE. The processor 2923 may control overall operation of the RN 2920.

The RN 2920 according to an embodiment of the present invention may be configured so as to receive a downlink control channel. The processor 2923 of the RN may be configured so as to determine candidate positions at which an R-PDCCH is transmitted in a first slot and a second slot of a downlink subframe. In addition, the processor 2923 may be configured so as to monitor whether or not the R-PDCCH is being transmitted at the determined candidate positions. The processor 2923 may be configured so as to receive, upon determining through monitoring that an R-PDCCH is being transmitted, downlink control information included in the R-PDCCH through the reception module 2921. Here, the candidate R-PDCCH positions may be set as a VRB set including N VRBs. In addition, one candidate R-PDCCH position for a higher aggregation level may be configured through 2 adjacent candidate positions from among candidate R-PDCCH positions for a lower aggregation level.

The processor 2923 of the RN 2920 may also perform a function such as arithmetic processing on information received by the RN 2920, information to be externally transmitted, or the like and the memory 2924 may store arithmetically processed information or the like for a predetermined time and may be replaced with a component such as a buffer (not shown).

The configurations of the eNodeB and RN described above may be implemented such that each of the various embodiments of the present invention described above may be independently applied or 2 or more thereof may be simultaneously applied to the eNodeB and RN and redundant descriptions are omitted herein for clear explanation of the present invention.

Although the exemplary description of FIG. 29 has been given with reference to MIMO transmission between the eNodeB and the RN, it will be apparent to those skilled in the art that the description of the eNodeB 2910 of FIG. 29 may be applied to an arbitrary downlink transmission entity (eNodeB or RN) and the description of the RN 2920 of FIG. 29 may also be applied to an arbitrary downlink reception entity (UE or RN). For example, the configuration of the eNodeB which is configured so as to perform downlink transmission to the RN as described above as an example with reference to FIG. 29 may be equally applied to an eNodeB that performs downlink transmission to the RN or the RN that performs downlink transmission to a UE. In addition, for example, the configuration of the RN which is configured so as to perform downlink reception from the eNodeB as described above as an example with reference to FIG. 29 may be equally applied to a UE that performs downlink reception from the eNodeB or a UE that performs downlink reception from the RN. Specifically, the various embodiments suggested by the present invention may be equally applied to an embodiment in which a downlink reception entity is configured so as to determine candidate positions at which an advanced downlink control channel can be transmitted in a first slot and/or a second slot of a downlink subframe and to monitor the control channel to receive and acquire downlink control information through the control channel.

The embodiments of the present invention described above may be implemented by various means. For example, the embodiments of the present invention may be implemented by hardware, firmware, software, or any combination thereof.

In the case in which the present invention is implemented by hardware, the methods according to the embodiments of the present invention may be implemented by one or more Application Specific Integrated Circuits (ASICs), Digital Signal Processors (DSPs), Digital Signal Processing Devices (DSPDs), Programmable Logic Devices (PIDs), Field Programmable Gate Arrays (FPGAs), processors, controllers, microcontrollers, microprocessors, or the like.

In the case in which the present invention is implemented by firmware or software, the methods according to the embodiments of the present invention may be implemented in the form of modules, processes, functions, or the like which perform the features or operations described below. Software code can be stored in a memory unit so as to be executed by a processor. The memory unit may be located inside or outside the processor and can communicate data with the processor through a variety of known means.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may combine the structures described in the above embodiments in a variety of ways. Accordingly, the invention should not be limited to the specific embodiments described herein, but should be accorded the broadest scope consistent with the principles and novel features disclosed herein.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced within the scope of the invention. The invention should not be limited to the specific embodiments described herein, but should be accorded the broadest scope consistent with the principles and novel features disclosed herein. In addition, it will be apparent that claims which are not explicitly dependent on each other can be combined to provide an embodiment or new claims can be added through amendment after this application is filed.

The embodiments of the present invention described above may be applied to various mobile communication systems.

What is claimed is:

1. A method for a relay to receive downlink control information from a base station through a Relay-Physical Downlink Control Channel (R-PDCCH), the method comprising:
    obtaining at least one candidate position for the R-PDCCH;
    monitoring, based on the at least one candidate position, a Virtual Resource Block (VRB) set for the R-PDCCH including downlink control information; and
    receiving the downlink control information included in the R-PDCCH,
    wherein the at least one candidate position is within the VRB set including one or more VRBs, and one candidate position for the R-PDCCH of a higher aggregation level includes a combination of 2 adjacent candidate positions among candidate positions for the R-PDCCH of a lower aggregation level.

2. The method according to claim 1, wherein the R-PDCCH is not interleaved with another R-PDCCH.

3. The method according to claim 1, wherein the at least one candidate position for the R-PDCCH is determined according to distributed VRB-to-Physical Resource Block (PRB) mapping.

4. The method according to claim 3, wherein the VRB set and the VRB-to-PRB mapping are set by a higher layer signal.

5. The method according to claim 1, wherein the downlink control information is downlink allocation information included in an R-PDCCH transmitted in a first slot or uplink grant information included in an R-PDCCH transmitted in a second slot.

6. The method according to claim 1, wherein the same VRB set is set in a first slot and a second slot of a downlink subframe.

7. A relay for performing a downlink signal in a wireless communication system, the relay comprising:
    a reception module configured to receive the downlink signal from a base station;
    a transmission module configured to transmit an uplink signal to the base station; and
    a processor configured to control the reception module and the transmission module,
    wherein the processor is further configured to:
        obtain at least one candidate position for a Relay-Physical Downlink Control Channel (R-PDCCH),
        monitor, based on the at least one candidate position, a Virtual Resource Block (VRB) set for the R-PDCCH including downlink control information, and
        receive the downlink control information included in the R-PDCCH through the reception module,
    wherein the at least one candidate position is within the VRB set including one or more VRBs, and one candidate position for the R-PDCCH of a higher aggregation level includes a combination of 2 adjacent candidate positions among candidate positions for the R-PDCCH of a lower aggregation level.

8. The relay according to claim 7, wherein the R-PDCCH is not interleaved with another R-PDCCH.

9. The relay according to claim 7, wherein the at least one candidate position for the R-PDCCH is determined according to distributed VRB-to-Physical Resource Block (PRB) mapping.

10. The relay according to claim 9, wherein the VRB set and the VRB-to-PRB mapping are set by a higher layer signal.

11. The relay according to claim 7, wherein the downlink control information is downlink allocation information included in an R-PDCCH transmitted in a first slot or uplink grant information included in an R-PDCCH transmitted in a second slot.

12. The relay according to claim 7, wherein the same VRB set is set in a first slot and a second slot of a downlink subframe.

* * * * *